US012112612B2

(12) United States Patent
Triventi et al.

(10) Patent No.: US 12,112,612 B2
(45) Date of Patent: Oct. 8, 2024

(54) PEST CONTROL SYSTEM HAVING EVENT MONITORING

(71) Applicant: Smart Wave Technologies, Inc., Mounds View, MN (US)

(72) Inventors: Joe Triventi, Toronto (CA); Volodimir Bondarenko, Toronto (CA); Gavin Singh, Toronto (CA); Clemente Receno, Toronto (CA); Peter Zosimadis, Toronto (CA); Mike Zosimadis, Toronto (CA); Andrew Hunt, Toronto (CA)

(73) Assignee: Smart Wave Technologies, Inc., Mounds View, MN (US)

( * ) Notice: Subject to any disclaimer, the term of this patent is extended or adjusted under 35 U.S.C. 154(b) by 175 days.

(21) Appl. No.: 17/812,367

(22) Filed: Jul. 13, 2022

(65) Prior Publication Data
US 2023/0041695 A1    Feb. 9, 2023

Related U.S. Application Data

(60) Continuation of application No. 16/935,169, filed on Jul. 21, 2020, now Pat. No. 11,417,197, which is a division of application No. 16/458,895, filed on Jul. 1, 2019, now Pat. No. 10,991,230.

(60) Provisional application No. 62/692,453, filed on Jun. 29, 2018.

(51) Int. Cl.
G08B 25/00    (2006.01)
A01M 23/38    (2006.01)
G08B 13/26    (2006.01)
G08B 29/18    (2006.01)

(52) U.S. Cl.
CPC ........... *G08B 25/009* (2013.01); *A01M 23/38* (2013.01); *G08B 13/26* (2013.01); *G08B 29/185* (2013.01)

(58) Field of Classification Search
CPC .... G08B 25/009; G08B 13/26; G08B 29/185; A01M 23/38
USPC ........................................................ 340/597
See application file for complete search history.

(56) References Cited

U.S. PATENT DOCUMENTS

| 1,484,964 | A | 2/1924 | Benneville |
| 1,489,904 | A | 4/1924 | Morris |
| 2,286,662 | A | 6/1942 | Edith et al. |
| 2,392,512 | A | 1/1946 | Thompson |
| 2,570,138 | A | 10/1951 | Mackay |

(Continued)

FOREIGN PATENT DOCUMENTS

| CA | 2392512 A1 | 4/2002 |
| CA | 2682101 A1 | 10/2008 |

(Continued)

OTHER PUBLICATIONS

US Office Action, U.S. Appl. No. 16/458,895; Mailed: Apr. 16, 2020; 6 Pages.

(Continued)

*Primary Examiner* — Omar Casillashernandez
(74) *Attorney, Agent, or Firm* — Whitmyer IP Group LLC

(57) ABSTRACT

Pest control systems and methods are described. The systems comprise a portable electronic device which is configured to identify one or more of multiple PCDs within a range of a portable electric device which have been activated, and to provide an indication to a user corresponding to at least one of the identified activated PCDs.

11 Claims, 19 Drawing Sheets

(56) References Cited

U.S. PATENT DOCUMENTS

| | | | |
|---|---|---|---|
| 2,682,101 | A | 6/1954 | Whitfield et al. |
| 3,022,366 | A | 2/1962 | Kilroy |
| 3,026,389 | A | 3/1962 | Jean |
| 3,151,661 | A | 10/1964 | Matthews |
| 6,016,623 | A | 1/2000 | Celestine |
| 6,937,156 | B2 | 8/2005 | Gardner, Jr. et al. |
| 7,020,996 | B2 | 4/2006 | Beroza et al. |
| 7,656,300 | B2 | 2/2010 | Rnnau |
| D828,484 | S | 9/2018 | Vickery et al. |
| 10,085,133 | B2 | 9/2018 | Borth et al. |
| 10,226,039 | B2 | 3/2019 | Buchstaller et al. |
| 2003/0160699 | A1 | 8/2003 | Trompen |
| 2003/0184442 | A1* | 10/2003 | Gardner, Jr. ........ A01M 31/002 340/573.2 |
| 2003/0213161 | A1 | 11/2003 | Gardner, Jr. et al. |
| 2004/0090419 | A1 | 5/2004 | Dalsey |
| 2007/0040677 | A1 | 2/2007 | Blair |
| 2007/0120690 | A1 | 5/2007 | Barber et al. |
| 2009/0002493 | A1 | 1/2009 | Kates |
| 2009/0192763 | A1 | 7/2009 | Gardner, Jr. et al. |
| 2009/0199457 | A1 | 8/2009 | Grigorov et al. |
| 2012/0066958 | A1 | 3/2012 | Mcginnis, Jr. |
| 2012/0212338 | A1 | 8/2012 | Borth et al. |
| 2013/0031824 | A1 | 2/2013 | Arlichson |
| 2013/0075484 | A1 | 3/2013 | Rhee et al. |
| 2013/0174469 | A1* | 7/2013 | Kittelson .............. A01M 23/18 43/61 |
| 2014/0013649 | A1 | 1/2014 | Rivera |
| 2015/0150236 | A1 | 6/2015 | Grant |
| 2015/0208636 | A1 | 7/2015 | David et al. |
| 2016/0238737 | A1 | 8/2016 | Jant et al. |
| 2017/0300966 | A1 | 10/2017 | Dereszynski et al. |
| 2017/0318796 | A1 | 11/2017 | Vaisblat et al. |
| 2017/0354139 | A1 | 12/2017 | Vickery et al. |
| 2018/0027795 | A1 | 2/2018 | Jant et al. |
| 2018/0084772 | A1 | 3/2018 | Peeters et al. |
| 2018/0125052 | A1 | 5/2018 | Johnson |
| 2018/0199565 | A1* | 7/2018 | Zosimadis ............ A01M 23/00 |
| 2018/0217639 | A1 | 8/2018 | Jones et al. |
| 2018/0235205 | A1 | 8/2018 | Howard et al. |
| 2018/0249699 | A1 | 9/2018 | Daly, Jr. |
| 2018/0295831 | A1 | 10/2018 | Reid et al. |
| 2018/0368382 | A1 | 12/2018 | Carpenter |
| 2019/0008591 | A1 | 1/2019 | Desai et al. |
| 2019/0020694 | A1 | 1/2019 | Winawer et al. |
| 2019/0075781 | A1 | 3/2019 | Redmayne |
| 2019/0138242 | A1 | 5/2019 | Lewins et al. |

FOREIGN PATENT DOCUMENTS

| | | |
|---|---|---|
| CA | 3022366 A1 | 12/2017 |
| CA | 3026389 A1 | 12/2017 |
| CN | 102143683 A | 8/2011 |
| CN | 107438398 A | 12/2017 |
| EP | 1489904 A1 | 12/2004 |
| EP | 2286662 A1 | 2/2011 |
| EP | 1484964 B1 | 7/2016 |
| EP | 3151661 A1 | 4/2017 |
| GB | 201800518 | 2/2018 |
| GB | 201800518 A | 7/2019 |
| GB | 2570138 B | 7/2020 |
| WO | 2010030346 A1 | 3/2010 |
| WO | 2016110804 A1 | 7/2016 |
| WO | 2018217639 A1 | 11/2018 |
| WO | 2019008591 A2 | 1/2019 |
| WO | 2019020694 A1 | 1/2019 |
| WO | 2019138242 A1 | 7/2019 |

OTHER PUBLICATIONS

International Search Report & Written Opinion of the International Searching Authority; Application No. PCT/IB2019/055473; Completed: Dec. 23, 2019; Mailing Date: Jan. 16, 2020; 15 Pages.
US Office Action; U.S. Appl. No. 16/458,895; Issued: Aug. 6, 2020.
US Office Action; U.S. Appl. No. 16/458,895; dated Apr. 16, 2020.
Extended European Search Report; Application No. 19825562.2; Completed: Jun. 30, 2021; Issued: Jul. 14, 2021; 8 Pages.
US Office Action; Application No. 16/935, 169; Issued: Aug. 25, 2021.
US Office Action; Application No. 16/935, 169; Issued: Dec. 27, 2021.
Canadian Office Action; Application; Application No. 3,105,280; Issued: Oct. 13, 2023; 5 Pages.
Australian Office Action; Application No. 2019293531; Issued: Apr. 22, 2024; 6 Pages.

* cited by examiner

PEST CONTROL SYSTEM HAVING EVENT MONITORING

FIELD OF THE INVENTION

The invention relates to a pest control system having event monitoring. Generally, the pest control system collects and manages event data from multiple pest control devices (PCDs) and filters and reports data to a portable electronic device when in range. The invention provides PCDs having sensors and sensor filters that improve the accuracy of determining activity within a PCD as well as systems enabling improved decision making over time.

BACKGROUND OF THE INVENTION

Pests such as rodents or insects can be a significant problem in a wide range of locations, climates and situations. For example, rodents such as rats and mice have been a problem to humans for thousands of years and have generally followed humans wherever humans have settled around the world. The problems that rodents can cause are varied. For example, in addition to the loss that they can cause by eating foodstuffs, they may also contaminate foodstuffs by leaving behind various contaminants such as their saliva, faeces and/or urine in addition to any other contaminants they may carry. Rodents may also cause damage to the fabric of a building by, for example, chewing wiring or nesting within wall cavities. In addition, rodents may harbor and transmit a number of diseases. They may also carry parasites, such as fleas and ticks. Rodent populations can also grow quickly.

Similarly, various insects such as termites, ants and many others can also be a significant problem and cause similar effects. As a result, effective and timely action to prevent or deal with a pest infestation including both rodents and insects remains an important problem.

Throughout history, humans have devised many solutions for controlling or reducing pest populations and there are presently thousands of businesses whose primary services are the control/reduction of pests.

In a typical modern insect or rodent control system, multiple pest control devices (referred to herein as "PCDs") are placed around a facility (e.g. a warehouse, a farm, a home or an office block). PCDs are generally kill-type devices that lure the pest to the trap with a bait and that then kill the pest by various devices or poison-type devices that utilize a bait laced with a poison. Depending on the climate, environment or situation, facilities may commonly have fifty or more PCDs deployed throughout the facility. Pest control agents (referred to herein as "PCAs") are employed to manually check these PCDs periodically (e.g. weekly or monthly). In order to manually check the PCDs, the PCAs must locate the PCDs (by finding them or knowing where they are) and inspect the PCDs (e.g. visually) to determine whether they have been activated and/or require attention.

Some rodents, such as rats, are instinctively wary of things new to their environment, including various types of PCDs (eg. live-, kill- or poison-type PCDs. Manually inspecting a PCD may impart a new smell onto the PCD and/or change the position of the PCD which may lead to the rodents avoiding the PCD and thereby reducing PCD efficacy. In addition, rodents may also colonize in almost any type of structure or location including attics, burrows, under concrete and porches, in wall voids and other hard-to-reach places in buildings as well as many locations within a commercial building or warehouse including within goods and/or industrial equipment. As it is generally desirable to place PCDs near to where a problem may exist, manual inspection of PCDs located in or near these areas undesirable and/or difficult for the PCA.

As such, operating and maintaining pest (e.g. rodent) control technology often requires significant labor, with most of the time and hence costs in controlling pest populations incurred from monitoring PCDs.

By way of example of a typical scenario, a warehouse facility having a pest problem will engage with a pest control company to deploy and monitor a number of PCDs throughout one or more warehouses. The warehouse facility can cover a significant land area having both inside and outside areas which may include a variety of storage areas interconnected by various walkways which may be on a single level or may include several different levels interconnected by stairs or ladders. As noted above, when PCDs are deployed they are preferably placed in locations where the pest problem is perceived to be greatest and which may be in inconvenient places. The pest control company will document where the PCDs have been deployed and then based on an agreement with the facility/business owner, monitor the PCDs on a regular basis.

Depending on the type of problem (e.g. rat, mouse, insect), different types of PCDs may be deployed.

As noted, PCDs may be categorized as poison type PCDs, live trapping PCDs and mechanical kill PCDs, each of which have various advantages and disadvantages depending on the specific situation and objectives.

A poison type PCD is designed to lure the pest into the PCD, commonly referred to as a bait station, whereupon ideally the pest retrieves bait containing a poison, leaves the bait station and then subsequently consumes the bait. The pest will then die away from the PCD. In the case of rodents, the rodent may also carry enough poisoned bait away from the PCD to feed other animals (e.g. young) that do not enter the PCD.

Live traps can be designed to trap an animal or capture part of the animal's body within a chamber whereupon depending on the design will either allow the animal to die or enable retrieval of the live animal which can then be released in another location unharmed. These traps may use various mechanically activated systems to close off a chamber to trap the animal or may use other systems such as adhesives that cause an animal to become adhered to a surface thus preventing them from leaving.

Mechanical kill traps are generally designed to quickly kill a pest by mechanical force when the pest activates a trigger.

Each type of PCD has various advantages and disadvantages in different situations.

Poison-type PCDs are advantaged by being able to eliminate a larger number of animals from a certain quantity of bait. The poisoned animal will typically perish away from the PCD and hence, the need to dispose of the animal's body may not be required. However, in various situations particularly humid or moist environments, this can also be a disadvantage in that the animal's body may decompose in an unknown location and lead to other undesirable effects including smells and disease propagation. Moreover, the quantity of bait removed is not necessarily correlated to the number of pests that may have been eliminated.

Live PCDs are preferable to some people as a humane alternative if the animal is not killed and can be relocated. However, handling of trapped, live animals can be difficult and is generally more costly due to the equipment and time required to relocate multiple animals. Moreover, by relocating animals, one may simply be transferring the pest problem to another location. Further still, if an animal is trapped and not removed quickly, it may die anyway from hunger and/or thirst, thus defeating the purpose of it being a humane live trap. Hence, in certain situations these PCDs are further disadvantaged by the need to monitor them on effectively a daily basis.

Generally, live PCDs that adhere a pest within the PCD may be quite effective for insect type pests but less so for rodents as a struggling rodent may scare off other pests from entering the PCD. Moreover, such PCDs also require a worker to handle dead, dying and/or decaying bodies of the pest.

Mechanical kill PCDs can be effective and humane but have the disadvantages of often needing to be reset and similar problems of handling dead, dying and/or decaying bodies of the pest. Also, once a mechanical kill device has been triggered, it must usually be manually reset before becoming effective again.

Regardless of the type of PCD, the worker/agent inspecting or monitoring multiple PCDs will be required to expend a certain amount of time within a facility investigating the status of each PCD. Within a facility, a worker is generally responsible for producing a report that indicates the number of PCDs inspected and the number of pests that have been captured or killed over a given time period. For poison type PCDs, the number of killed pests is loosely correlated to the amount of bait removed.

In Applicant's previous patent application (PCT/CA2016/050860), incorporated herein by reference, systems and methods for improving the efficiency of collection of data from a plurality of PCDs are described. More specifically, in that application, a portable electronic device capable of wirelessly connecting to a plurality of PCDs and obtaining data from the PCDs and reporting that data to a central database is described.

The nature of pests' interactions with a PCD is varied and complex. Different animals/pests will interact with a PCD in a number of different ways depending on the type of the PCD, the design of the PCD, the bait being used and other factors. For example, in a bait station type PCD, rodents such as mice will be attracted to the odor of bait that may emanate from the bait station. Drawn towards a bait station, the mouse will generally a) interact with the bait station and retrieve or consume the bait, b) interact with the bait station and not retrieve or consume the bait or c) approach the bait station and not interact. In a given time period, there may also be no interactions by a pest with a bait station.

Each type of interaction can provide useful information to a pest control company that can then be used to learn about a pest problem, the effectiveness of a pest control strategy, reporting to the customer as well as subsequent adjustment or modification of the pest control strategy.

Ideally, both the pest control company and the customer desire accurate data and the delivery of that data in a cost-effective way. That is, a balance between the cost of trapping equipment and the technical sophistication of the equipment must be made to provide a practical cost to a consumer. In other words, overly sophisticated and expensive equipment will not be effective in the marketplace, particularly in situations where dozens or hundreds of PCDs must be deployed.

Accordingly, there has been a need for improved PCDs and the networks connecting PCDs where the interaction of a pest with a PCD can be accurately measured and data regarding how the pest interacted with the PCD can be obtained and analyzed. More specifically and in addition, there has been a need for systems that improve the process by which pest control service personnel interact with a number of PCDs, as well as improving the accuracy of information collected during monitoring and service. In addition, there has been a need to reduce or eliminate unnecessary visits of the pest control personnel to facilities by remote monitoring.

Different pests (e.g. mice vs. rats vs. insects) each have different physical and behavioral characteristics and will exhibit different patterns of interaction with a PCD. Mice are generally smaller than rats and will generally show different movement patterns. For example, rats may move more slowly as compared to mice. Also, both mice and rats are generally careful creatures and will usually approach a PCD with caution. When approaching or entering a PCD, they will usually not go in right away, may back off for a period of time, may wait in one area before eventually moving to an area where the bait may be. Similarly, insects will show different movement patterns as well.

For a pest control agent (PCA) who is responsible for accessing PCDs and replacing bait and/or removing dead animals, the PCA wants to receive reliable information that accurately reports the status of PCDs and specifically that minimizes both false positives and false negatives with respect to the status of the PCD. That is, the PCA does not want to receive an indication that a PCD status "requires attention" namely that the PCD is empty of bait or has a dead animal in it, go to the trouble of accessing the PCD only to discover that the status of the PCD is fine and does not require attention.

Similarly, the PCA does not want to receive an indication that the PCD status is "good" when in fact the PCD is empty of bait and/or a dead animal is in the trap.

Further still, it is expected that over time, different PCDs with different sensors will evolve such that a new system of PCDs having a particular sensor array improves the accuracy of determining PCD status by the new combination of sensors. In addition, data from different PCDs and different deployment situations will be collected over time that represents the many different types of animate and in-animate interactions of animals and other materials with a PCD. As such, as new field data is collected and analyzed, it is also important to be able to effectively update other PCDs in the system with software so that the accuracy of interpreting interactions within other PCDs can be improved.

For example, a first system of PCDs with new sensors may be deployed in one area and a second series of PCDs with the new sensors are deployed in another area. All the PCDs may be initially deployed with software/firmware that is understood to be effective. The first area may receive very little pest traffic initially whereas the second area receives significantly higher traffic. Over time, data collected from both areas may be uploaded and analyzed where it is learned that changes to the filtering/processing of data results in improved accuracy. It may then be determined that instances of false positives or false negatives can be improved via better filtering or processing of data. Hence, all PCDs in the system and/or portable monitoring devices that receive raw or filtered data from individual PCDs may need to be updated to improve the ongoing accuracy.

PCDs will also be deployed in different areas having different environmental conditions (e.g. temperature, humidity and other conditions related to seasonal and weather changes) and significant variations in the type and number of animals interacting with the PCDs. As such, there is a need to differentiate and understand the nature of those environmental and interaction differences.

Further still, there has also been a need for a system that enables filtering/processing equipment within the system to be upgraded with new processing algorithms over the time of a deployment.

SUMMARY OF THE INVENTION

In accordance with a first aspect, there is provided a pest control system (PCS) comprising at least one pest control device (PCD) each PCD having: at least one sensor, the at least one sensor configured to detect a body within a region of the PCD; a PCD controller operatively connected to the at least one sensor, the PCD controller configured to receive raw data from the at least one sensor including device event data representing presence or movement of animate bodies adjacent the at least one sensor; and, a wireless communication system operatively connected to the controller for transmitting data from the PCD controller to a relaying communication device (RCD) having an RCD controller.

In various embodiments, additional features of the system include various combinations of the following:
- a. The PCD controller is configured to pre-filter the raw data as device event data representing presence or movement of animate bodies and non-live data representing presence or movement of non-animate bodies.
- b. The PCD controller is configured to transmit device event data to the RCD and discard non-live event data.
- c. The PCD controller is configured to transmit raw data to the RCD.

In further embodiments, the PCS is configured to include one or more of the following:
- a. The RCD is configured for operative communication with at least one PCD and each RCD is configured to receive data from at least one PCD controller and configured with an RCD analysis algorithm to analyze the data to determine PCD status.
- b. PCD status is designated as a) does-not-require-attention or b) requires-attention and where the RCD includes a display system configured to display PCD status.
- c. The RCD includes an input system enabling a user to manually verify if a PCD status as analyzed and displayed is true or not-true, and wherein manually entered verification is defined as verification data.
- d. The PCS includes a central computer system (CCS) configured to operatively connect to each RCD and upload raw data from each PCD to the CCS.
- e. Raw data from each PCD is correlated to the verification data.
- f. The CCS is configured with a CCS algorithm configured to compare the verification data and the raw data to calculate a frequency of false-positive and false-negative events associated with particular raw data patterns.
- g. The CCS is configured to back test a CCS algorithm on raw data to determine the effectiveness of the CCS algorithm on reducing the frequency of false-positive and false-negative events.
- h. The CCS is configured to update each PCD and RCD controller with adjusted filtering and analysis algorithms.
- i. The RCD controller is configured to filter raw data to determine whether a PCD requires attention.
- j. The PCS includes at least one mesh communication node device operatively connected to at least one PCD and where communication between the at least one PCD, mesh communication node device and CCS is substantially continuous.
- k. The at least one sensor is a capacitive sensor and the capacitive sensor and PCD controller are configured to monitor a combination of movement and activation signals where movement signals include a frequency of movements adjacent the at least one sensor and an activation signal corresponds to a detection time and duration of a mass adjacent the at least one sensor.
- l. The PCS is configured such that combinations of movement and activation signals are analyzed by the RCD controller within pre-defined time periods and where number and frequency variations of movement and activation signals within the pre-defined time periods are evaluated as a basis of determining the presence or absence of an animate object.
- m. The PCS is configured such that the capacitive sensor and PCD controller dynamically adjust an activation threshold for an activation signal.
- n. The capacitive sensor is a single electrode capacitive sensor.

In another aspect a pest control device (PCD) is provided, the PCD having a PCD body having an entrance region and an event region and at least one sensor, the at least one sensor configured to detect a body within a region of the PCD body; a PCD controller operatively connected to the at least one sensor, the PCD controller configured to analyze raw data received from the at least one sensor; and, a wireless communication system operatively connected to the PCD controller for transmitting filtered data from the PCD controller to a relaying communication device (RCD).

In various aspects of the PCD, one or more of the following may be included:
- a. The PCD controller is configured to pre-filter the raw data as device event data representing presence or movement of animate bodies and non-live data representing presence or movement of non-animate bodies.
- b. The PCD controller is configured to transmit device event data to the RCD and discard non-live event data.
- c. The PCD controller is configured to transmit raw data to the RCD.
- d. The PCD is a live or kill trap and the at least one sensor is configured to the event region.
- e. The PCD is a bait station and the at least one sensor is configured to a sensor region located between the entrance region and event region.
- f. The at least one sensor is a capacitive sensor, the capacitive sensor for detecting the movement of animate objects past the entrance region towards the bait or trap region.
- g. The capacitive sensor and PCD controller are enabled to monitor a combination of movement and activation signals where movement signals correspond to a frequency of movement adjacent the at least one sensor and an activation signal corresponds to a detection time and duration of a mass adjacent the at least one sensor.
- h. The RCD is configured to analyze raw data where combinations of movement and activation signals are analyzed within pre-defined time periods and where number and frequency variations of movement and activation signals within the pre-defined time periods are evaluated as a basis of determining the presence or absence of an animate object.

i. The sensor is a capacitive sensor and the capacitive sensor and PCD controller are configured to dynamically adjust an activation threshold for an activation signal.

j. The sensor is a single electrode capacitive sensor.

In another aspect, the invention provides a method of collecting data from a plurality of pest control devices (PCDs), comprising the steps of: within a PCD having: at least one sensor configured to detect movement of an animate body within a region of the PCD; a PCD controller operatively connected to the at least one sensor and configured to analyze raw data received from the at least one sensor; and, a wireless communication system operatively connected to the PCD controller and configured to transmit any one of or a combination of raw data and pre-filtered raw event data from the controller to a relaying communication device (RCD);

a. analyzing raw data from the at least one sensor; and,
b. uploading data to a relaying communicating device (RCD).

In further embodiments of the method, the method may include:

a. a step of pre-filtering raw data between animate object data and non-animate object data prior to uploading data to the RCD.
b. At the RCD, analyzing animate object data from the PCD based on current pattern recognition algorithms and determining PCD status as i) requires-attention or ii) does-not-require-attention and iii) displaying PCD status to a user.
c. Enabling a user to manually verify if a PCD status as reported is true or not true, and wherein manually entered verification is defined as verification data.
d. Enabling a central computer system (CCS) to operatively connect to each RCD and where any one of or a combination of raw data and pre-filtered raw data from each PCD is uploaded to the CCS.
e. Correlating raw data from each PCD to the verification data.
f. Enabling analysis of the verification data and the raw data at the CCS.
g. Configuring the CCS to back test an adjusted filtering algorithm on past raw data to test the effectiveness of the adjusted filtering algorithm.
h. Configuring the CCS to update each PCD and RCD with adjusted filtering and analyzing algorithms.
i. Configuring each of the PCD and RCDs to a mesh communication network.
j. Where the at least one sensor is a capacitive sensor, enabling the capacitive sensor and controller to monitor a combination of movement and activation signals where movement signals correspond to a frequency of movement adjacent the at least one sensor and an activation signal corresponds to a detection time and duration of a mass adjacent the at least one sensor.
k. Analyzing combinations of movement and activation signals within pre-defined time periods and where number and frequency variations of movement and activation signals within the pre-defined time periods are evaluated as a basis of determining the presence or absence of an animate object.
l. Dynamically adjusting the capacitive sensor to adjust an activation threshold for an activation signal.

In a further aspect, the invention provides a pest control device (PCD) comprising: a PCD body, the PCD having a floor and a wall system defining at least one passageway from outside the PCD body to inside the PCD body, the floor including an event zone, a sensor zone and an entrance zone, the event zone having means to attract a pest to interact with the event zone, the event zone being positioned within the PCD body such that a pest successively passes through the entrance zone and sensor zone to reach the event zone; and, a sensor system operatively configured to the sensor zone, the sensor system configured to detect movement of a pest from the entrance zone to the event zone, the sensor system including a wireless communication system having an antenna and where the sensor system is configured to the sensor zone and where the communication system and antenna are sealed within a sensor compartment.

In various embodiments, the PCD may further include any one or a combination of:

a. A PCD body having an external body and a separate floor and wall system tray configured for placement within the PCD.
b. A sensor system including a printed circuit board (PCB), a battery power system and at least one movement sensor and where the printed circuit board, battery power system and at least one movement sensor are positioned flat against the underside of the floor and where the movement sensor is operative through the floor to detect movement on an upper surface of the floor in the sensor zone.
c. An antenna projecting through the floor and contained within an antenna cavity.
d. A sensor system permanently sealed within the sensor compartment.
e. A PCD body including a separate and retro-fit floor system, where the retro-fit floor system can be selectively positioned and removed from the PCD body.
f. A capacitive sensor operatively positioned on the underside of the sensor zone.
g. The sensor system includes a single electrode capacitive sensor.

BRIEF DESCRIPTION OF THE DRAWINGS

The invention is described with reference to the accompanying figures in which.

DETAILED DESCRIPTION OF THE INVENTION

With reference to the drawings, systems and methods of obtaining data from pest control devices (PCDs) are described that incorporate sensor and control systems enabling improved identification of device events. In addition, systems and methods of filtering device event data and using device event data across a plurality of PCDs to improve identification of device events are described.

In the context of the description herein, PCDs generally relate to poison, live and kill PCDs having systems that monitor device events. PCDs may actively capture animals/creatures or may enable an animal/creature to engage with poison bait to cause subsequent effect. For the purposes of general description, systems are described in relation to rodents although it is understood that systems enabling controlling other animals/creatures including insects are contemplated.

Within this description, "device events" are events where an animal (also referred to as "live events") is physically restrained within a PCD or engages with and removes bait from the PCD. "Approach events" are events where an animal approaches/enters a PCD but does not activate a trapping mechanism or engages with and removes bait. Other events include "non-animal events" (also referred to as "non-live events") with a PCD and can include events where other physical objects may come into contact with the PCD including debris. "No events" is the status of a PCD if no animals have interacted with the PCD.

System Overview

Generally, the invention includes a portable electronic device configured to receive local wireless communications signals from one or more PCDs within a range, the PCDs being configured to monitor activation of a PCD when a rodent has been trapped or has engaged with and removed bait from the PCD (i.e. a device event). The portable electronic device is configured, in response to the received local wireless communications signals: to identify at least one of the multiple PCDs in range which have had a device event; and to provide an indication to a user of the device events. Allowing the user to determine whether the PCDs have had device events remotely mitigates the need for a manual or visual inspection to obtain this information.

Figure 1A:
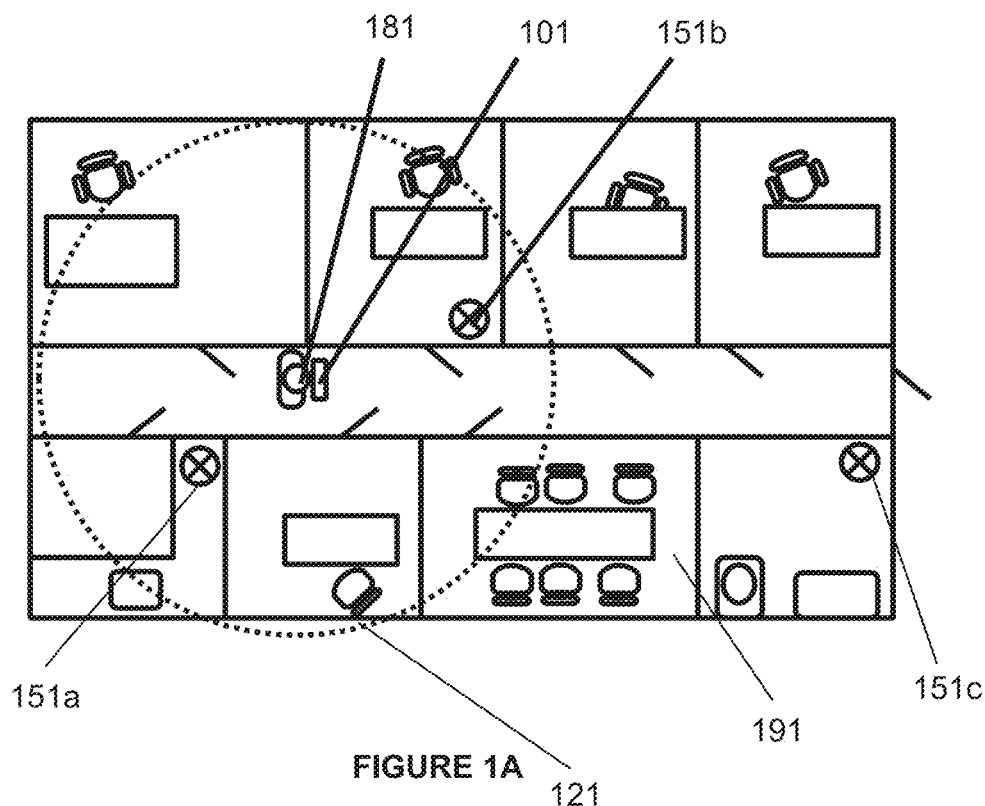
FIG. 1A is an overhead view of a facility in which a rodent control agent is using a portable electronic device to inspect three rodent PCDs located within the facility.
Figure 1B:
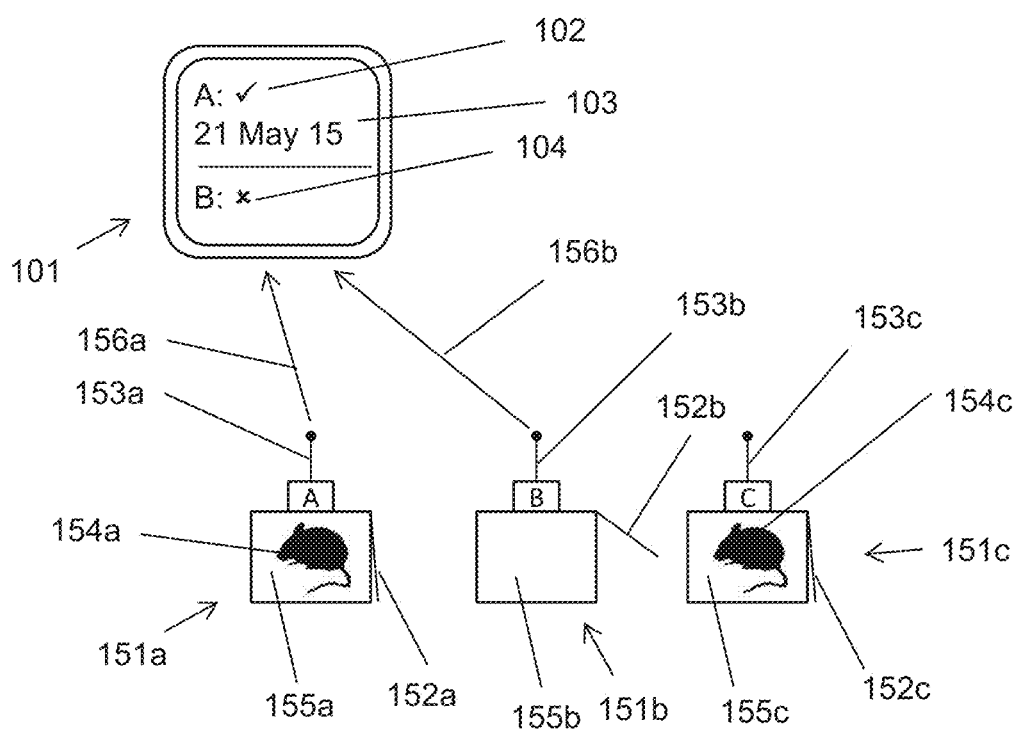
FIG. 1B is a schematic showing the interaction between the portable electronic device and the PCDs within range.

FIGS. 1A-1B, show a first embodiment of a portable electronic device 101 which, in this case, is a portable electronic device being used by a rodent/pest control agent (the user 181) to determine whether any of the PCDs 151*a-c* within a range 121 have had a device event. The portable electronic device may be for example, a smart phone or tablet or laptop computer configured with application software of the invention.

FIG. 1A is a plan view of a typical facility 191, in this case an office. It will be appreciated that pest control may be used in other facilities such as warehouses, farms, storage buildings, granaries, shops, trucks, kitchens or houses.

In this case, the office has been supplied with three rodent PCDs 151*a-c* placed at various locations within the office facility 191. The rodent control agent user 181 is inspecting the various PCDs within the office facility 191 using a portable electronic device 101. In this case, the portable electronic device 101 is configured to receive local wireless communications signals from multiple rodent PCDs within a range 121, the rodent PCDs being configured to determine if a device event has occurred, wherein the portable electronic device 101 is configured, in response to the received local wireless communications signals: to identify at least one of the multiple PCDs 151*a-c* in range 121 which have had a device event or not; and to provide an indication 102 to a user of the device and/or other events for a PCD.

As the user passes through the office facility 191, one or more PCDs move into the range 121 of the portable electronic device. In the situation shown in FIGS. 1A and 1B, two PCDs 151*a-b* are within range and one device 151*c* is out of range. It will be appreciated that as the portable electronic device is moved through the facility, PCDs which previously were out of range may come within range thereby enabling the portable electronic device to interact with them.

In this case, the portable electronic device comprises a short-range radio frequency transceiver with a range of about 20-100 feet (6-30 meters). The transceiver is configured to provide a broadcast signal to any rodent PCDs within the range 121 in order to prompt transmission of the local wireless communications signals 156*a-b* from the PCDs within range. To enable transmission of the local wireless communications signals, each PCD comprises a transmitter 153*a-c* configured to transmit short-range radio frequency local wireless communication signals.

It will be appreciated that each transmitter 153*a-c* may form part of an activation-detection module, the activation-detection module comprising: a connector, the connector configured to connect the activation-detection module to the PCD; a sensor, the sensor connected to a controller and configured to sense when the PCD has had a device event; and a transmitter, the transmitter connected to the controller and configured to transmit data relating to the device event. The module may have a small form factor (e.g. 1 inch diameter module).

By prompting transmission of the local wireless communications signals 156a-b, the energy consumption of the PCD transmitter may be reduced as the PCD transmitter need only be active when an appropriately configured portable electronic device is within range. In addition, the PCD transmitter may reduce power consumption by transmitting the local wireless communication signals in a narrow beam directed towards the portable electronic device (e.g. a unicast transmission) rather than transmitting broadcast local wireless communications signals. The local wireless communications signals, in this case, also comprise short-range radio frequency signals.

FIG. 1B shows the interaction between the PCDs 151a-c and the portable electronic device 101.

In a first example, each of the rodent PCDs 151a-c comprises a non-lethal PCD. The non-lethal PCDs 151a-c each comprises a chamber 155a-c with an activation member 152a-c, which in this case is a spring-loaded door. The spring-loaded door is configured to move from a first primed position (in this case, when the spring-loaded door is open) to a second activated position (in this case, when the spring-loaded door is closed) in order to trap a rodent 154a, 154c.

The spring-loaded door activation member 152a-c is controlled in this case, by a trigger (not shown) configured to initiate movement of the activation member from the first primed position to a second activated position. In this case, the trigger comprises an infrared trigger sensor configured to determine when a rodent is in the chamber by detecting the rodent's body heat.

As described in greater detail below, it will be appreciated that other sensors may be used to detect the presence of a rodent such as one or more of: a capacitive sensor, a vibration sensor and/or an optical sensor. In this case, when the sensor detects a rodent in the chamber it sends a signal (e.g. wired or wireless signal) to a trap controller which, in response to receiving the trigger signal, enables release of the spring-loaded door from the primed position to the activated closed position thereby trapping the rodent in the chamber. In other embodiments, the trigger may comprise a mechanical trigger.

The trigger sensor, in this case, also serves as an activation sensor configured to determine when the PCD is activated. That is, the trigger sensor also sends a signal to the trap controller indicating that the PCD has been activated (i.e. a device event). It will be appreciated that in some embodiments, the PCD may comprise a first sensor configured to activate the PCD, and a second distinct sensor configured to determine whether the PCD has been activated.

In this case, the trap controller is configured, in response to receiving the activation sensor signal and the prompt signal from the portable electronic device, to enable transmission by the transmitter 153a-c of an activated local wireless communications signal. In this case, the device controller is also configured, in response to receiving the prompt signal from the portable electronic device when an activation sensor signal has not been received, to enable transmission by the transmitter 153a-c of an unactivated local wireless communications signal (e.g. a no event signal that comprises information relating to the unactivated state of the trap). In other embodiments, transmission is always enabled but will transmit different information depending on whether the sensor has been activated or not as explained in greater detail below.

In the case shown in FIGS. 1A-1B, one of the rodent PCDs 151a within range has been activated and one of the rodent PCDs 151b within range has not been activated.

In this embodiment, the portable electronic device is configured to receive local wireless communications signaling from PCDs within range which have been activated and PCDs which have not been activated. In this case, the portable electronic device comprises a processor and a memory which is configured to identify each of the PCDs in range based on information encoded in the local wireless communication signals. That is, each of the PCDs are configured to transmit local wireless communication signals comprising identification information as well as information relating to whether the PCD has been activated.

In this case, the portable electronic device controller is configured to determine whether the received local wireless communications signal includes a device signal to determine whether or not the PCD has been activated.

In this case, the portable electronic device controller 101 provides a visual indication of the device-status information to the user in the form of a table displayed on a screen with each PCD within range being identified on the screen by a letter (device 151a corresponding to the letter 'A', and device 151b corresponding to the letter 'B'); and an associated tick 102 indicating that the device has had a device event or a cross 105 indicating that the device has not had a device event.

In addition, the portable electronic device is configured to receive and process activation time information from the activated rodent PCDs. In this case, the device controllers are configured to record the date and time that the PCD was activated and transmit this information to the portable electronic device via the local wireless communication signals. This information is decoded by the portable electronic device 101 and displayed on screen 103.

This activation time information may be useful in determining a strategy for placing and/or inspecting the PCDs within a facility. In this case the PCD is configured to enable provision of data to an external electronic device, the data comprising information on which of the multiple PCDs had been activated. The provision of data may be enabled by transmitting information wirelessly (e.g. via Wi-Fi, Bluetooth®) and/or by storing information locally on the portable electronic device for later retrieval (using, for example, a USB stick, or a wired or wireless connection).

Figure 2A:
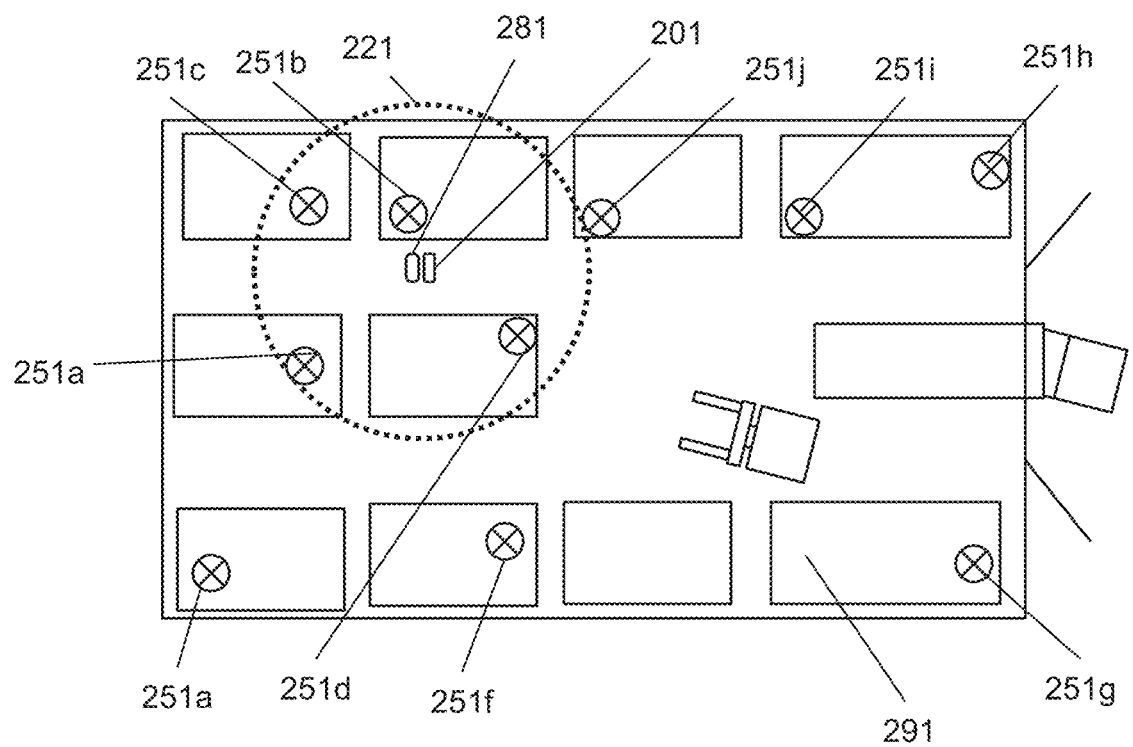
FIG. 2A is an overhead view of a facility in which a rodent control agent is using a portable electronic device to inspect ten rodent PCDs located within the facility.
Figure 2B:
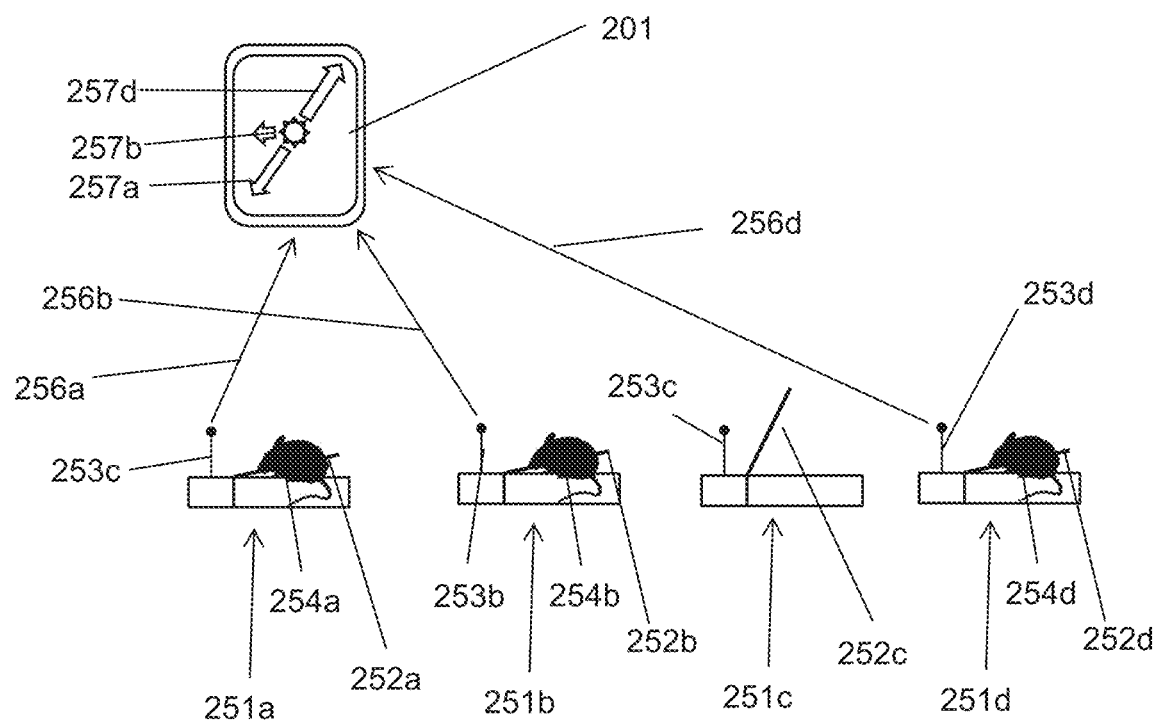
FIG. 2B is a schematic showing the interaction between the portable electronic device and the PCDs within range.

FIGS. 2A-2B, show a second embodiment of a portable electronic device which, in this case, is a tablet computer being used by a rodent control agent to determine whether a number of PCDs have been activated.

FIG. 2A is a plan view of a facility, in this case a warehouse storing cattle feedstuffs stored on pallets.

In this case, the warehouse has been supplied with ten PCDs placed at various locations within the warehouse facility. The rodent control agent 281 user is inspecting the various PCDs 251a-j within the office facility using a portable electronic device 201. It will be appreciated that PCDs in a warehouse may be difficult to locate as they may be stored within the pallets or high up and out of reach. In this case, the portable electronic device is configured to receive local wireless communications signals 256a,b,d from multiple PCDs within a range, the PCDs being configured to activate in order to trap a rodent, wherein the portable electronic device is configured, in response to the received local wireless communications signals: to identify at least one of the multiple PCDs in range 221 which have been activated; and to provide an indication 256a-d to a user of the at least one identified activated PCDs.

As the rodent control agent user 281 passes through the warehouse facility 291, one or more PCDs move into the range of the portable electronic device. In the situation shown in FIGS. 2A and 2B, four PCDs 251*a-d* are within range and six PCDs 251*e-j* are out of range. It will be appreciated that as the portable electronic device is moved through the facility PCDs which previously were out of range may come within range thereby enabling the portable electronic device to interact with them.

In this case, the portable electronic device 201 comprises a short-range radio frequency receiver. The receiver is configured to receive local wireless communication signal broadcasts from the PCDs. Unlike the previous embodiment, the PCDs in this case are configured to transmit broadcast wireless communication signals 256*a,b,d* when they have been activated. PCDs which have not been activated are configured not to transmit broadcast wireless communication signals. By only transmitting local wireless communications signals when the PCD has been activated, the energy consumption of the PCD transmitter may be reduced.

FIG. 2B shows the interaction between the PCDs and the portable electronic device.

In this case, each of the PCDs 251*a-j* is configured to kill the rodent 254*a,b,d*. In this case the PCDs 251*a-j* each comprises a spring-loaded bar trap. In this case the activation member 252*a-d* is a spring-loaded bar but can be in various embodiments other humane killing systems.

The spring-loaded door activation member is controlled, in this case, by a trigger configured to initiate movement of the activation member 252*a-d* from the first primed position to a second activated position. In this case, the trigger comprises mechanical trigger mechanism configured to hold the spring-loaded bar 252*a-d* in the primed position. When the rodent moves the mechanical trigger mechanism (e.g. by moving bait attached to the mechanical trigger mechanism), the spring-loaded bar 252*a-d* is released to move from the open primed position to the closed activated position.

Each PCD in this case also comprises an activation sensor which, in this case, is a micro-switch configured to be turned on when the spring-loaded bar activation member 252*a-d* is in the closed activated position. When the activation sensor is activated the PCD is configured to broadcast local wireless communication signals via a transmitter 253*a-d*.

In this embodiment, the portable electronic device 201 is configured to receive local wireless communications 256*a,b,d* signaling from PCDs within range which have been activated. In this case, the portable electronic device is configured to identify the at least one of the multiple PCDs in range based on the angle of incidence of the local wireless communication signals. That is, in this embodiment, the local wireless communication signaling provided by the various activated PCDs are the same. However, the portable electronic device 201 is in this case configured to identify and distinguish between the PCDs based on the location of the PCDs. In order to do this, the portable electronic device comprises a phased-array antenna configured to measure the angle of incidence of the incoming local wireless communications signaling for each of the activated PCDs. It will be appreciated that by configuring the portable electronic device to distinguish between the PCDs based on the angle of incidence of the local wireless communication signaling, PCDs may be mass produced to transmit the same activation signaling because it mitigates the need for the PCDs to transmit identifying signals.

In this case the portable electronic device 201 provides the information to the user visually in the form of an arrow indication 257*a,b,d*, each arrow indication indicating the location of an activated PCD 251*a,b,d* relative to the portable electronic device (and to the user). It will be appreciated that other indications may be used to indicate the relative or absolute position of a PCD. The angle of arrow indication 257*a,b,d* indicates the direction to the corresponding activated PCD and the length of the arrow indication 257*a,b,d* indicates the proximity of the corresponding activated PCD (short arrows indicate a close proximity and long arrows indicate that a PCD is farther away). It will be appreciated that by providing a location indication, the user does not need to know beforehand where the PCDs have been positioned. This may be particularly useful where the PCDs may be moved with time (e.g. a PCD located in a pallet being moved with the pallet) or where there is no set location for PCD (e.g. a rodent control agent inspecting PCDs in trucks transporting foodstuffs long-distance).

In addition, in this case, the portable electronic device is configured to generate activation time information associated with the activated rodent PCDs. In this case, the portable electronic device is configured to record the number of activated PCDs in a particular facility for a given inspection. This activation time information may be useful in determining a strategy for placing and/or inspecting the PCDs within a facility. In this case the portable electronic is configured to enable provision of data to an external electronic device, the data comprising information on which of the multiple PCDs had been activated. The provision of data may be enabled by transmitting information wirelessly (e.g. via Wi-Fi, Bluetooth®) and/or by storing information locally on the portable electronic device for later retrieval (using, for example, a USB stick, or a wired or wireless connection).

It will be appreciated that in other embodiments, one or more of the PCDs may have one or more condition sensors comprising at least one of: a temperature sensor (e.g. a thermocouple or other thermometer); and a humidity sensor. The PCD may be configured to transmit recorded condition data such as temperature and/or humidity data (e.g. to the portable electronic device or other remote device). The condition sensor may be configured to measure the condition of the bait directly and/or the environment around the bait (e.g. the humidity within the chamber of a box trap).

General Communication Scheme

Figure 3A:
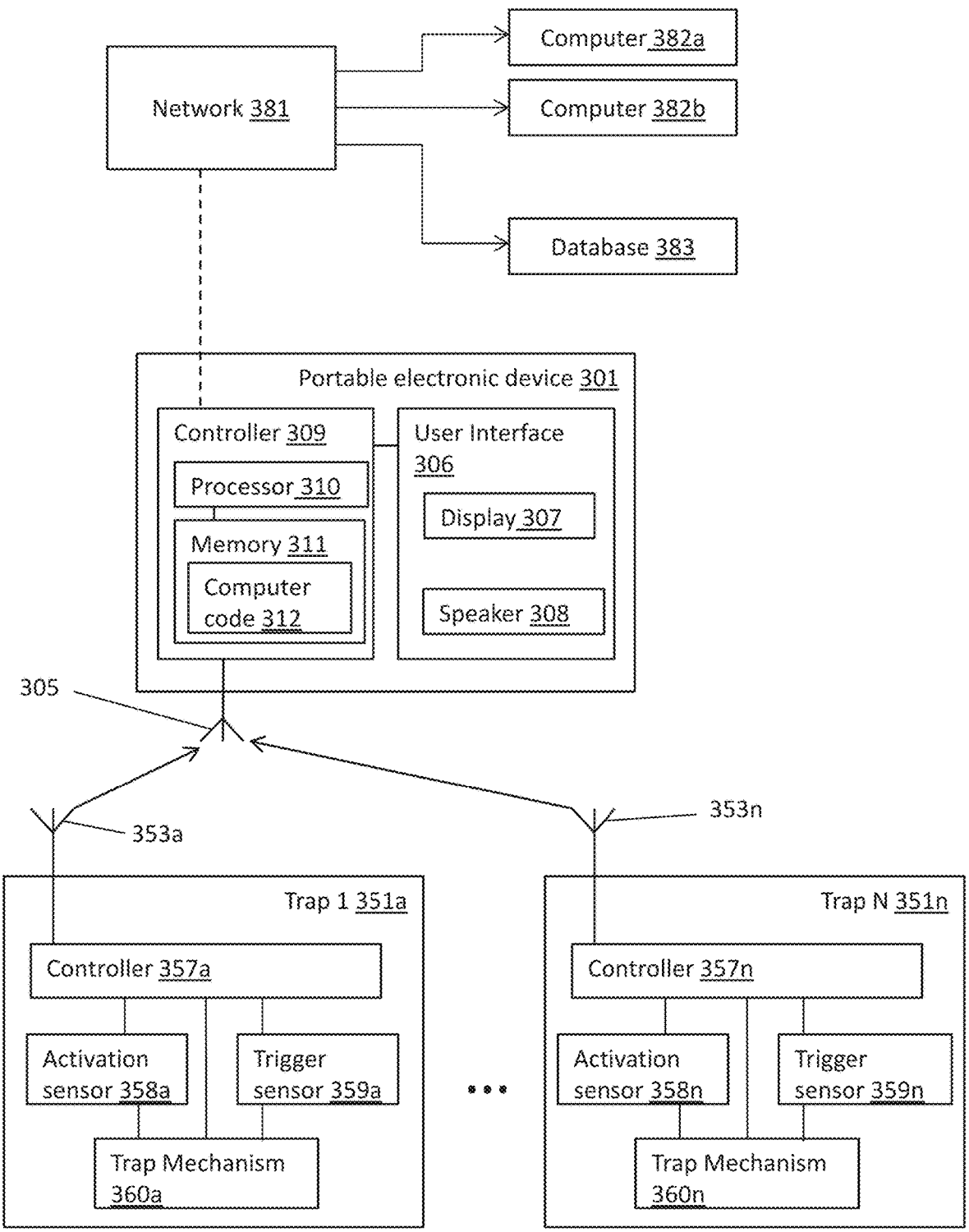
FIG. 3A is a schematic diagram showing the components of a pest control system and how they interact in accordance with one embodiment of the invention.

FIG. 3A is a schematic showing the components of a pest control system and how they interact.

In this case, the pest control system comprises a portable electronic device 301; a number of rodent PCDs 351*a-n*; a network 381; computers 382*a-b*; and a database 383.

The PCDs, in this case, comprise a trap mechanism 360*a-n* (e.g. a jaw trap mechanism, a spring-loaded bar mechanism) configured to trap a rodent by capturing or killing it. In this case, the trap mechanism 360*a-n* is configured to be activated in response to receiving a signal from the device controller (which may comprise a processor, a memory and computer program code). The device controller, in this case, is configured to activate the trap mechanism in response to receiving a trigger signal from the trigger sensor (e.g. an IR sensor or a vibration sensor). The trigger sensor is configured to detect the presence of a rodent in the trap. It will be appreciated that other PCDs may have a mechanical trigger rather than a trigger sensor 359*a-n*. In various embodiments, this can be done in reverse, namely activation of a mechanical switch followed by an electronic sensor.

In this case, the PCD comprises a separate activation sensor 358*a-n* (e.g. a micro switch) configured to sense when the trap mechanism has been activated. It will be appreciated that, as described in a previous embodiment, the trigger sensor may be the same as the activation sensor. In response to receiving a signal from the activation sensor, the device controller is configured to enable transmission of local wireless communication signaling indicating that the PCD has been activated. The transmission is facilitated by the PCD having a transmitter 353*a-n*.

It will be appreciated that the controller 357*a-n*, the activation sensor 358*a-n*, the trigger sensor 359*a-n* and the transmitter in each trap 351*a-n* may form part of an activation-detection module which may be retrofit to the trap mechanism 360*a-n*.

In this case, the portable electronic device 301 comprises a device controller 309 which includes a processor 310 (e.g. an ASIC), and memory 311 having computer program code 312 which, when run on the processor, controls the function of the portable electronic device. In this case, the portable electronic device also comprises a receiver 305 configured to receive local wireless communication signals from PCDs within range. The received local wireless communication signals are processed by the controller 309.

The device controller is configured to process the received local wireless communication signals in order to identify the PCD which transmitted the signals. The device controller may also be configured to determine a time associated with the trap activation.

The portable electronic device further comprises a user interface 306 which, in this case, comprises a display 307 and a speaker 308 in order to enable the provision of an indication to the user of one or more activated PCD. It will be appreciated that other embodiments may have different user interface components.

The portable electronic device 301, in this case, is also configured to enable connection with a network 381 (e.g. the internet) to facilitate transfer of data from the portable electronic device to the network. This may allow data associated with each PCD to be stored on a computer 382*a-b* or in a database 383. It will be appreciated that other embodiments may facilitate direct communication with an external computer or database. While described as a portable electronic device, in some embodiments and for some deployments, the portable electronic device may be in a fixed location.

Figure 3B:
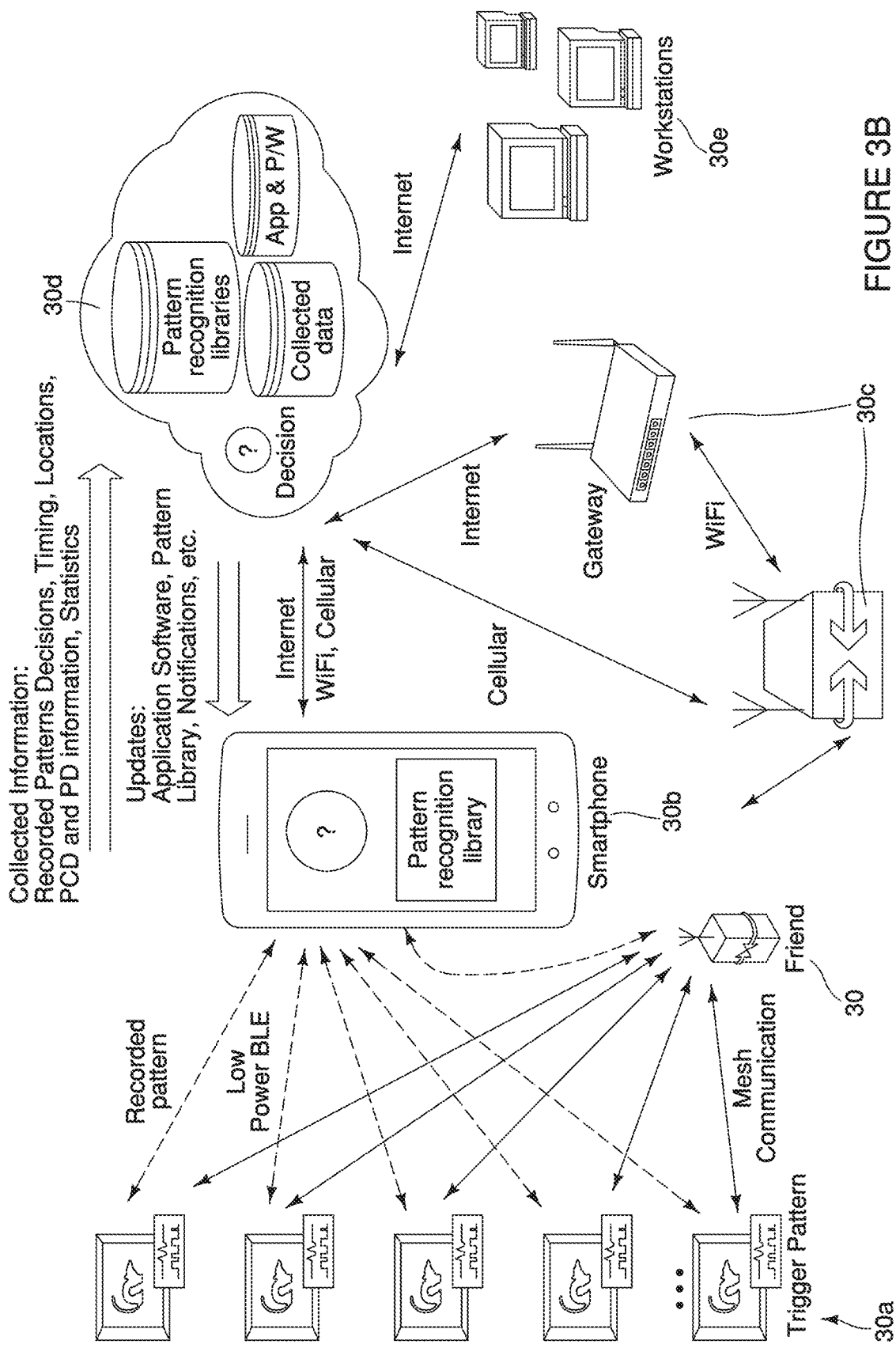
FIG. 3B is a schematic diagram of a network of devices of a pest control system and how they interact in accordance with another embodiment of the invention.

FIG. 3B shows a network configuration utilizing mesh communication technology. Generally, a plurality of nodes 30 is established at a facility which may be fixed or mobile repeater devices. Each repeater device operates to relay information between PCDs 30*a* and other network devices including portable electronic devices 30*b* and/or gateways 30*c* to a central computer system 30*d* and various workstations 30*e* that may be connected to the internet. In addition, each PCD may also be configured to communicate with a portable electronic device via alternate communication protocols such as Bluetooth™.

A mesh network (Bluetooth™ mesh communication, Zigbee™ etc.) provides various advantages over other communications systems in that data may be dynamically relayed via other nodes in the mesh in the event of breaking a communication link from one device to another for example due to the movement of a PCD from one location to another. As such, depending on the deployment, the system may enable substantially continuous and flexible communication between the end PCDs and the central computer system of the pest control system.

As such, in large facilities where dozens or hundreds of PCDs may be deployed and where PCDs may be moved over the course of a day, the PCDs may have continuous and/or semi-continuous communication with the central computer system.

Importantly, this functionality enables updates to be communicated back to PCDs as the updates occur rather than requiring a PCA to be within a facility to have any updates communicated. In addition, in some deployments, data about the status of PCDs can be uploaded and reviewed without the necessity of having a PCA on site to receive PCD status. This can be effective in determining when a PCA may visit a site as a visit may be planned only when PCDs require attention.

In one embodiment, advanced Bluetooth™ technologies may be implemented that incorporate angle estimation techniques for real-time locationing (RTLS). Generally, the angle of arrival (AoA) and angle of departure (AoD) are determined using arrays of antenna and processors that can see phase differences from a beacon signal at the different antennae.

As can be appreciated, RTLS can provide operators with dynamic information about the location of PCDs and improve the speed and accuracy by which PCDs may be serviced. For example, in situations where PCD status information is available in substantially real-time at the central computer system, a service call may be made using fewer PCA resources and/or the call may be completed in a shorter time period, if the PCA knows in advance which traps require service and the location of those traps.

Figure 4:
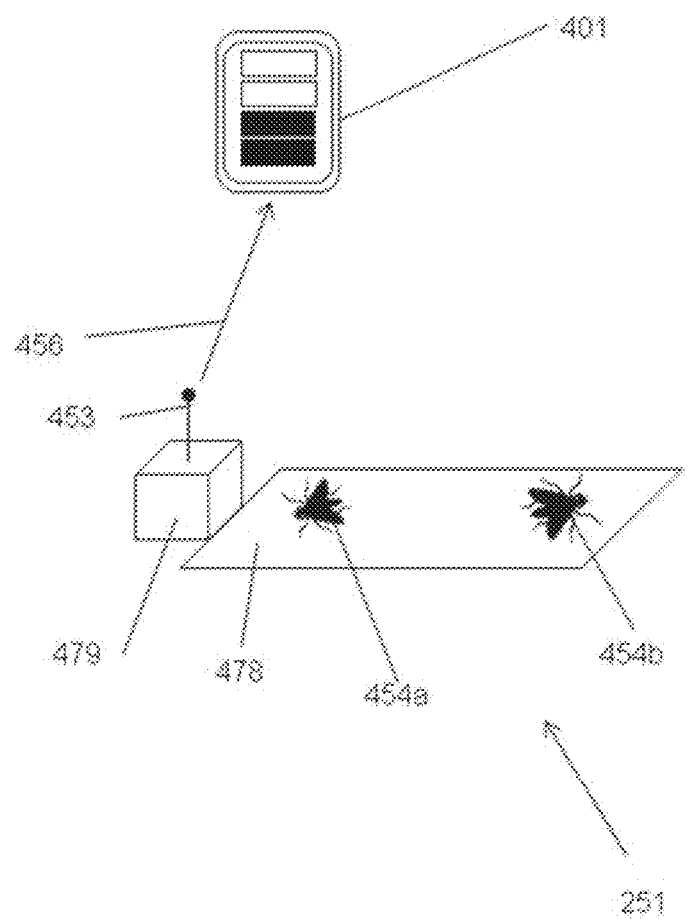
FIG. 4 is a schematic showing the interaction between the portable electronic device and a pest control trap utilizing an adhesive.

FIG. 4 is a schematic showing an insect pest trap interacting with a portable electronic device.

In this case, the pest trap includes an adhesive surface 478 configured to immobilize one or more pests (insects 454*a,b* in this case); a sensor configured 479 to detect the presence of one or more pests on the adhesive surface, the sensor configured to transmit data corresponding the detected presence of one or more pests to a controller (not shown); and a transmitter 453, the transmitter being connected to the controller and configured to transmit data to a remote electronic device 401.

In this case, the pest trap 451 is configured to immobilize the insects 454*a,b* by the insects being stuck to the adhesive strip 478. It will be appreciated that the adhesive strip may comprise bait to attract the pests to the adhesive strip.

The trap 451 in this case comprises an activation sensor which, in this case, is a vibration sensor configured to detect the vibration of the insects on the adhesive. When the activation sensor is activated the trap is configured to broadcast local wireless communication signals via a transmitter 453. It will be appreciated that other embodiments may use other sensors such as IR sensors or capacitive sensors to detect the presence of pests.

In this embodiment, the portable electronic device 401 is configured to receive local wireless communications 456 signaling from PCDs within range which have been activated. In this case, the portable electronic device 401 is configured to identify the at least one of the multiple PCDs in range based on the angle of incidence or angle of arrival of the local wireless communication signals.

In this case the portable electronic device 401 provides the information to the user visually in the form of a bar which gives an indication of the strength of the vibrations which can be correlated to the size and/or mass of the trapped insects. This allows the user to determine whether the adhesive strip needs to be replaced.

In addition, the PCDs are configured to generate activation time information associated with the activated PCDs. This activation time information may be useful in determining a strategy for placing and/or inspecting the PCDs within a facility. In this case, the portable electronic device is configured to enable provision of data to an external electronic device, the data comprising information on which of the multiple PCDs had been activated. The provision of data may be enabled by transmitting information wirelessly (e.g. via Wi-Fi, Bluetooth®) and/or by storing information locally on the portable electronic device for later retrieval (using, for example, a USB stick, or a wired or wireless connection).

It will be appreciated that the trap 251 may comprise a replaceable trap mechanism (e.g. the adhesive strip) and a retrofitable activation-detection module including a connector, the connector configured to connect the activation-detection module to the pest control trap; a sensor, the sensor connected to a controller and configured to sense when the pest control trap has been activated; and a transmitter, the transmitter connected to the controller and configured to transmit data relating to the activation of the pest control trap.

This may allow the activation detection module to be reused when the adhesive strip is exhausted. In this case, the connector may simply be a portion of the housing which connects to the adhesive strip to allow vibrations to pass between the adhesive strip and the vibration sensor.

Figure 5A:
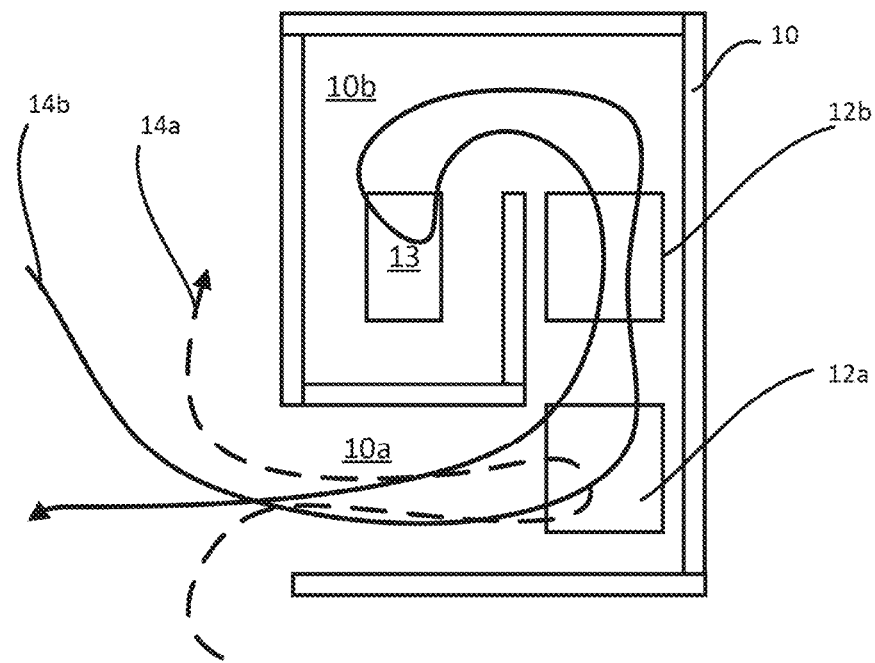
FIGS. 5A, 5B and 5C are schematic plan views of various PCDs and typical movement patterns of a pest in those PCDs.
Figure 5B:
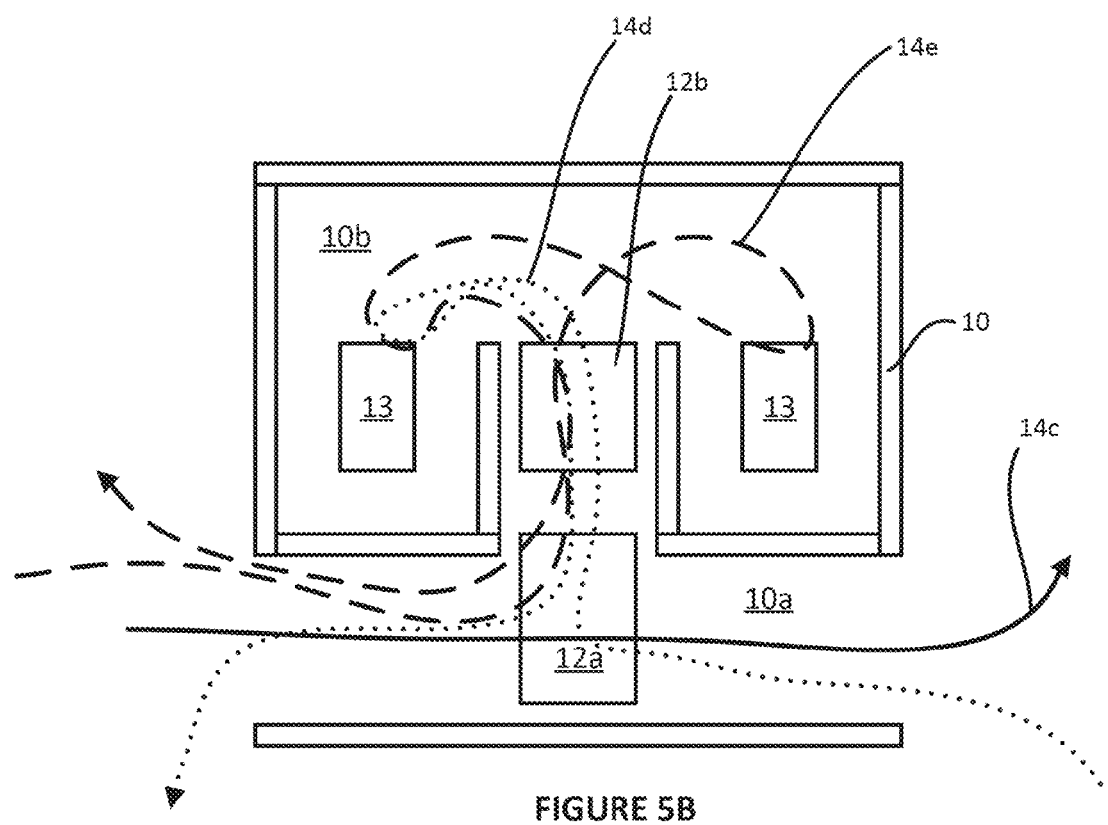

For poison bait PCDs, the interaction of an animal/insect is more complex and the identification of device events that constitute legitimate situations where an animal has entered the PCD and removed bait is more difficult to accurately ascertain. That is, as compared to trap systems where the animal is trapped or killed, multiple device events may occur where the same or different animals enter the PCD and remove bait. In addition, approach events may occur where an animal approaches the PCD but does not fully interact with the PCD (e.g. sniff around and leave because it is unfamiliar). As shown in FIGS. 5A and 5B, a schematic plan view of a PCD 10 having one (FIG. 5A) or two (FIG. 5B) distinct bait locations is shown together with representative interactions of a mouse with those PCDs.

FIG. 5A shows a PCD having an entrance area 10a and a bait area 10b as well as bait station 13. The PCD is configured with two sensors 12a and 12b which detect the movement of an animal into and/or through each area. As shown, the dashed line 14a shows a mouse entering the entrance area 10a and then departing whereas the dashed line 14b shows a mouse moving through the entrance area into the bait area 10b, to the bait station 13 and then leaving. FIG. 5B shows a different design of PCD having two bait stations with a common entrance 10a. Solid line 14c shows the path of an animal moving through the entrance area, dotted line 14d shows the path of an animal interacting with one bait station 13 and dashed line 14e shows an animal visiting two bait stations 13.

Figure 5C:
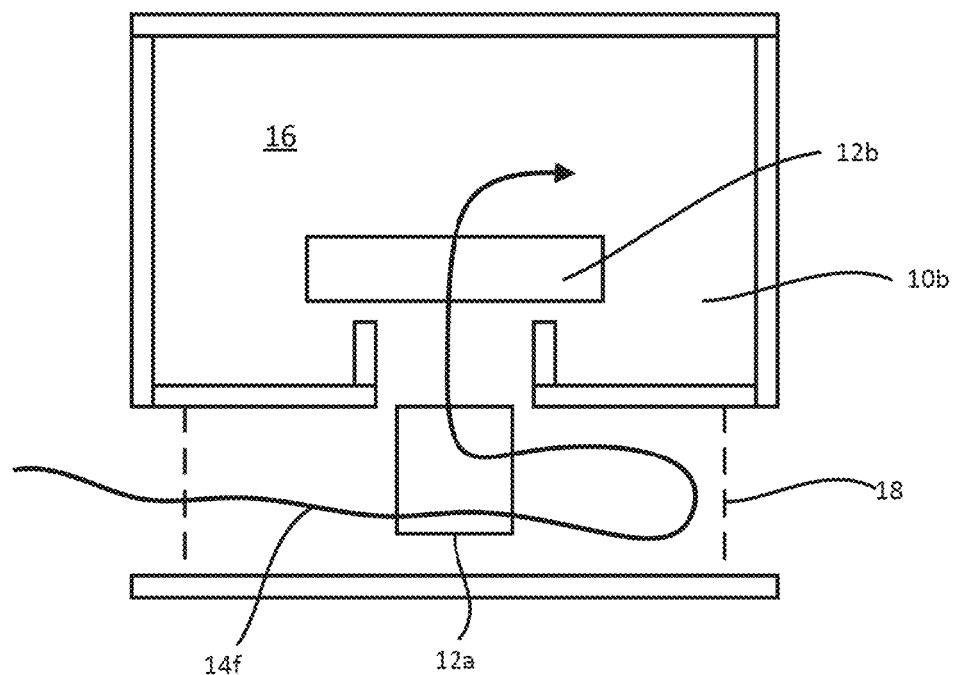

FIG. 5C shows a schematic plan view of adhesive type PCD having an adhesive floor 16 in the bait area 10b. This example is also shown with optional gates 18 that may be activated by an animal engaging with sensor 12a or a trigger adjacent the gate. Line 14f shows representative movement of an animal onto the adhesive 16.

Depending on whether each PCD is configured with a single sensor within the bait area or sensors at both the entrance area and bait area will provide additional information about the interaction of the animals with the PCD. Furthermore, in various embodiments, additional sensors may be configured to the bait stations and provide data about the actual interaction with the bait and, hence, more accurate monitoring of the bait. It will be appreciated that different designs will have different costs and, hence, while more sensors may provide additional and more accurate information, this additional information may not be required or wanted by different customers.

In various embodiments, each sensor (entrance area, bait area, bait, etc.) are capacitive sensors and preferably single-electrode capacitive sensors, operatively configured to the floor or walls of a PCD that produces signals in response to different stimuli at, near or on the sensor.

As can be seen from the above movement patterns, the movements of an animal can be quite varied and the above described patterns are only representative of what may be observed in the real world. Importantly, the movement patterns observed will often include movements of inanimate objects which can include various forms of contamination of the PCD that will change over time. As such, the sensor system is designed to differentiate between movements of animals and inanimate objects including contamination of the sensors.

In one embodiment, the sensors are configured to differentiate between animate and inanimate objects by detecting/monitoring activation events and movement events. Activation events are generally those events that represent the appearance of a larger mass near or over the sensor whereas movement events generally represent multiple movements within a given time frame and generally at a lower relative threshold compared to an activation event. The frequency of signals, the rate of change of frequency, time of and time between signal bundles as well as statistics relating to each of these factors can be used to interpret the type of event that may be occurring.

The ability to detect both activation events and movement events with a high degree of sensitivity is best achieved utilizing single electrode capacitive sensors as opposed to two electrode capacitive sensors. That is, two-electrode capacitor sensors generally rely on a body having a dielectric different than air to provide a conductive path between separated electrodes (i.e. a probe and a target) that have an applied voltage across them. With these sensors, as the body comes close to the electrodes, the body will affect the voltage across the electrodes. A change in voltage can be used to determine an event. However, two-electrode capacitive sensors generally do not have the sensitivity and hence, precision of a single-electrode capacitive sensor (SECS).

A SECS measures against a target surface that is electrically connected to ground. SECS can provide a high resolution in detecting events but generally require that the characteristics of the target surface be managed to provide that high resolution. SECS are controlled by a microcontroller that can dynamically adjust sensitivity thresholds.

Figure 6A:
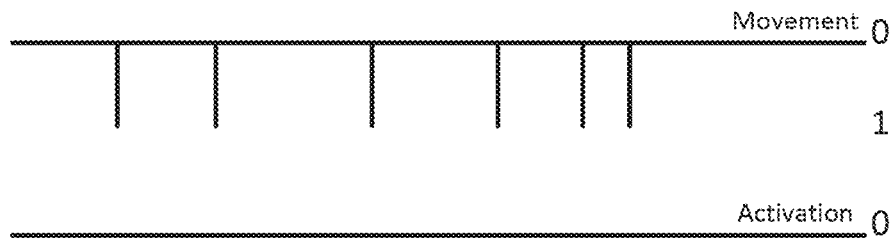
FIGS. 6A, 6B, 6C and 6D are sketches showing typical movement and activation patterns on a capacitive sensor in accordance with one embodiment of the invention.

As shown in FIGS. 6A, 6B, 6C and 6D, different representative signals from a SECS configured to detect and monitor activation and movement events are shown. Generally, in this case, a SECS is set up to detect capacitive events on the sensor having different thresholds. For example, FIG. 6A shows a representative situation showing detected movement events but no activation events. In this case, this signal pattern could be attributed to the random movement of small debris over the sensor and not to the movement of an animal.

Figure 6B:
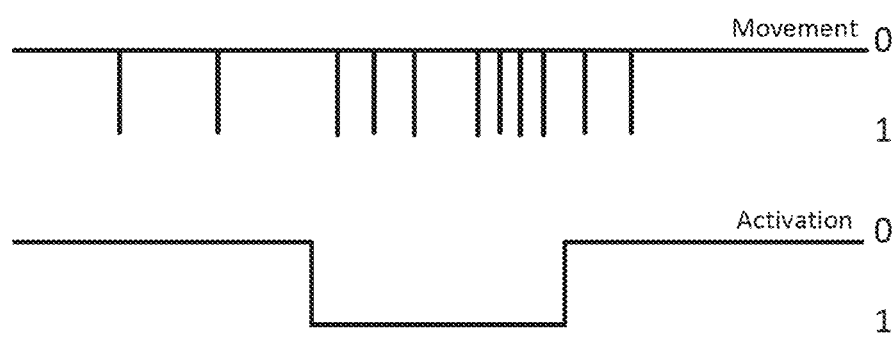

FIG. 6B shows a representative situation showing both movement and activation events that could be attributed to live animal movement over the SECS. In this case, the combination of both movement and activation events occurring at the same time together with movement signals on both sides of the activation signal could form the basis of an animate object recognition pattern.

Figure 6C:
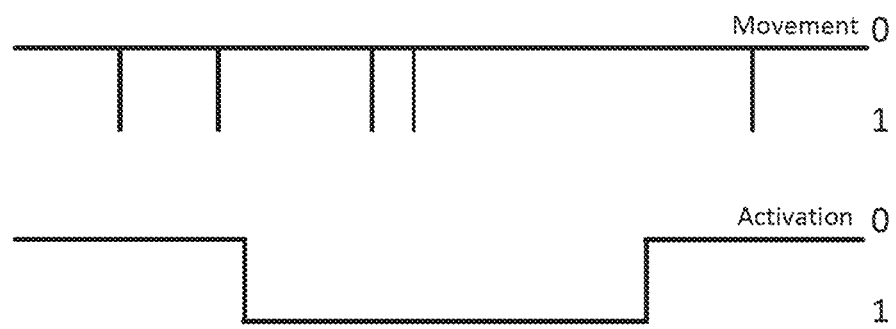

FIG. 6C shows a representative situation of a longer activation signal with less frequent and random movement signals that could be attributed to a stationary or slow moving mass on the sensor that could be attributable to an inanimate larger mass on the sensor (e.g. a dead animal or water contamination). Also, this could be attributed to a larger animal. As such, the patterns shown in FIG. 6C may be more difficult to understand and without refinement could potentially lead to a false positive or false negative decision being made.

Figure 6D:
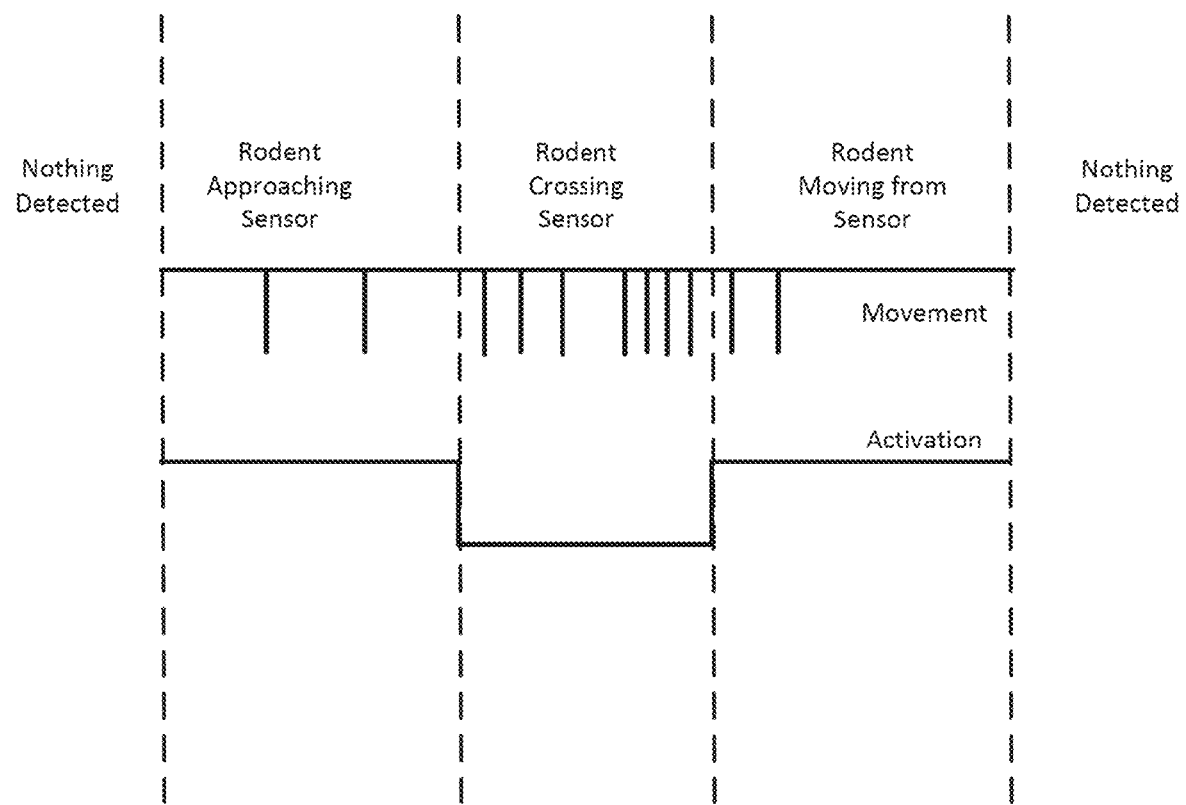

FIG. 6D show a representative situation of an animal approaching a sensor. In this example, the animal (e.g. a mouse) cautiously approaches the sensor with a halting and back and forth movement, as the animal sniffs around the sensor. The back and forth and side to side movement of the mouse's head, nose and whiskers will initially trigger movement pulses on the sensor potentially as the mouse's whiskers brush over the sensor. As the mouse moves onto the sensor, an activation pulse is triggered which due to the size of the mouse's body creates a larger capacitive signal. As the mouse moves over the sensor, multiple movement and relatively high frequency pulses are detected from the movement of the mouse's legs, feet, etc. As the mouse moves off the sensor, the activation pulse disappears but the continued lower mass movements such as from the mouse's tail may continue to produce movement pulses until the mouse moves past the sensor. In this case, this pattern may quite clearly represent the movement of a mouse.

All of the above is coupled to knowledge of the layout of the PCD including the type, number and position of the one or more sensors as shown in FIGS. 5A and 5B, such that the movement of the mouse can be interpreted. For example, in the PCD shown in FIG. 5A, each sensor 12a, 12b would register the signal pattern of a mouse travelling over each sensor two times if the mouse had entered the bait area 10b and then left the PCD as per pathway 14b. This would be distinguished from the movement pattern 14a where sensor 12a registered animal movement onto and off the sensor but sensor 12b did not. Hence, the former could be interpreted as an event where bait was retrieved while the latter would not. Importantly, many other movement patterns can occur as discussed below.

Table 1 shows representative and qualitative examples of different events that could occur within a PCD and the different signal patterns that could be received by different masses/bodies interacting with a sensor in accordance with one embodiment of the invention. Importantly, time and frequency considerations can be used to determine the likelihood of a particular type of movement be it animate or inanimate.

TABLE 1

Qualitative Examples of Signals at an Activation Sensor and Movement Sensor from Different Body Type Inputs

| Body Type | Activation Sensor (AS) | Movement Sensor (MS) | Comments |
| --- | --- | --- | --- |
| Small Debris blown in and out (e.g. Leaf or Stick) | Random activation then deactivation | None to a few random pulses | Small debris will generally move randomly based on external environmental factors |
| Small Debris blown in (e.g. Leaf or Stick) | Random Activation and no Deactivation | None to a few random pulses | Small debris may be blown onto a sensor and remain on the sensor. |
| Small Mouse | General sequence of MS pulses, AS pulse, AS deactivation; MS pulses. AS pulse may be overlaid with MS pulses. Two signals may be required to interpret movement to and from PCD. | | A small mouse may be detected by MS pulses during its approach and by MS pulses as it leaves. |
| Larger Mouse | As above with higher AS threshold | | |
| Rat | As above with higher AS threshold | | |
| Multiple Mice (2) | Longer AS pulse | Tighter clusters of MS pulses | Movement of multiple mice will be variable |
| Insect | Lower AS threshold | Higher frequency MS pulses | Insects having a lower mass will show a lower AS threshold. |
| Water Ingress | AS pulse (potentially continuous) | No MS pulses | Contamination from water that lands on the sensor may cause an AS pulse. |
| External Vibration | | Patterned MS pulses | Environmental effects from nearby equipment may create patterns of pulses. |
| Other Debris | Random Activation and no Deactivation | None to a few random pulses | Feces, urine, dead animals, food particles |

Importantly, SECS in a PCD may be subject to a variety of contaminations over a period of time which makes it more difficult to ascertain the presence of an animal as the animal's presence may be "masked" by the presence of contaminants including those as shown in Table 1.

Thus, over time as a sensor may become contaminated, the sensor system preferably adjusts for the effect of such contamination. That is, over time as the control system compares a measured capacitance with a threshold, if the sensor has become contaminated, the control system of the sensor will dynamically adjust the signal threshold to account for the progressive contamination.

For example, at time zero when a clean and fresh PCD is deployed, the sensor will have a first signal threshold. If an animal is the first object to interact with the PCD, and the animal cleanly moves off the PCD, the signal threshold will remain at that first threshold. However, if the animal contaminates the PCD during its interaction (e.g. urine or feces), the sensor may then measure an activation signal which stays "on". If the control system determines that this signal is likely contamination (e.g. through the absence of any movement signals over a period of time), the signal threshold would be reset such that new bodies appearing on the sensor would be recognized. As such, and as time progresses, the threshold that recognizes body movements will dynamically adjust.

When a PCD is reset and cleaned, the signal threshold would be reset to a base level. The sensor controller may also adjust a threshold down, for example in the case of fluids evaporation off the sensor.

In kill type PCDs, movement data may not be monitored but may just include a signal indicating activation of the trapping mechanism.

Filtering

PCD Level Filtering

At the PCD level, raw data is collected which will include activation and movement signals from each sensor. Depending on the PCD, and the frequency of visits and activations, the amount of raw data collected from each PCD may be significant and under various scenarios, it would be inefficient to upload all data to the portable device. Accordingly, prefiltering of the raw data at the PCD level in some cases is desirable.

Figure 7:
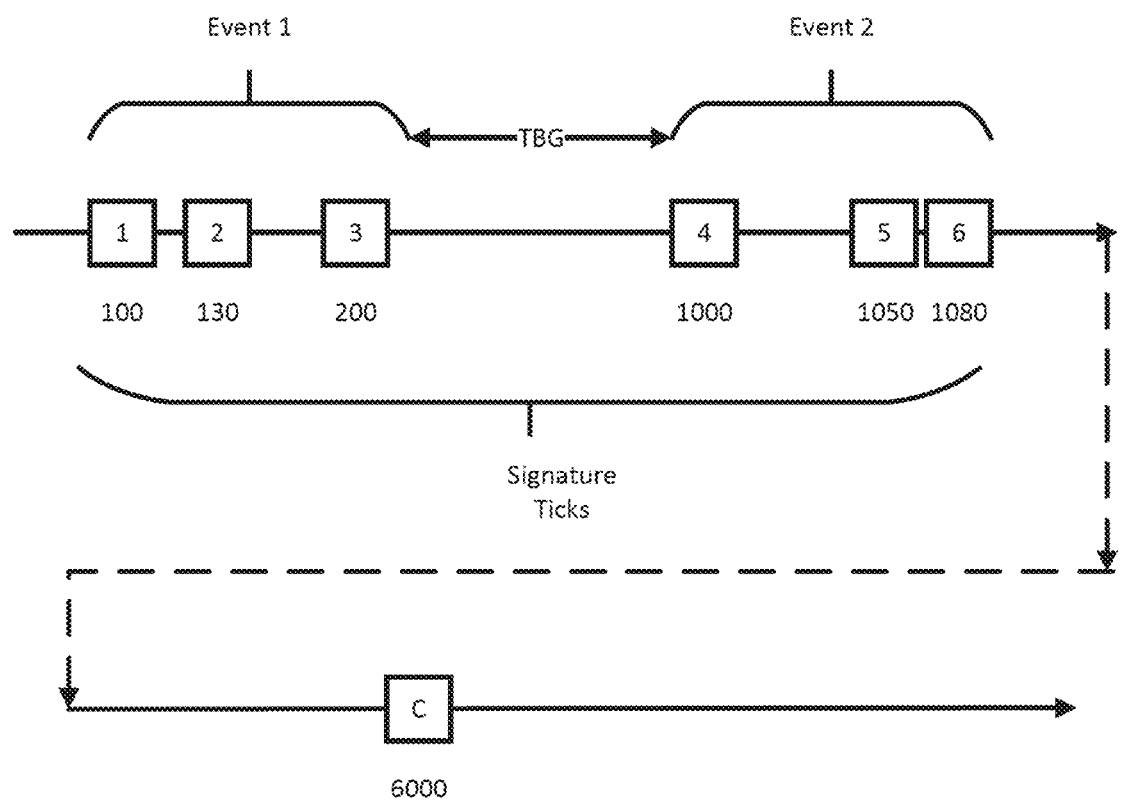
FIG. 7 is a sketch of how raw data may be collected and filtered in accordance with one embodiment of the invention.

FIG. 7 shows a potential event scenario. As shown, over a representative period of 20 minutes, a PCD may have experienced two events that can be interpreted as an animal incursion. The signal patterns established by each event are characterized as "ticks" that occur at specific times (relative to a controller's clock) and a specific resolution (e.g. 2 s). For example, event 1 is characterized by 3 "signatures" (1, 2, 3) and event 2 also by 3 signatures (4, 5, 6). At the raw data level (i.e. at the PCD), each signature is characterized by a number of activation and movement pulses that may be obtained at a higher resolution (e.g. 30 microseconds). Thus, a signature is characterized as a pattern of activation and movement pulses that may result from scenarios as outlined in Table 1. Accordingly, all events including animal and non-animal events will generate raw data at a relatively high resolution. This data may be evaluated or filtered to identify whether the event is an animal or non-animal event based on filtering algorithms at the portable device level. The data associated with non-animal events may be discarded.

Generally, it is desirable that an efficient amount of data is moved from each PCD to the portable devices and to the central computer system. If a continuous communication system is established (e.g. through a fixed node mesh communication system), data may be transferred substantially on demand. If a communication system utilizing moving PDs and/or nodes is established, consideration for the speed of movement of the PD is required to ensure that during the time of communication between the PD and PCD, sufficient time exists for the quantity of data to be transferred. Hence, the system may be set up in order that the most relevant data is transferred which may not be data at the highest resolution.

In one example, an animal event, namely one or more raw data events that are identified as potentially representing an animal will be marked as a "group" having a "timestamp". The time periods between groups will enable a "device event" to be identified that represents an animal incursion. The analysis may include analysis of time and changes of the frequencies of signals and other factors as mentioned above. For example, a first group may be associated with an animal moving over a sensor a first time, and a second group associated with an animal moving over a sensor a second time. If the two groups occurred within a specific time interval, the controller would identify the groups as an animal event. In PCDs/systems having more than 1 sensor, the number of groups required to constitute an event would normally be greater.

Importantly, the location of decision making can be made at a PCD or a PD; however, in most deployments, a PD (e.g. tablet or smart phone) having appropriate application software and access to the internet will be preferred.

Figure 8:
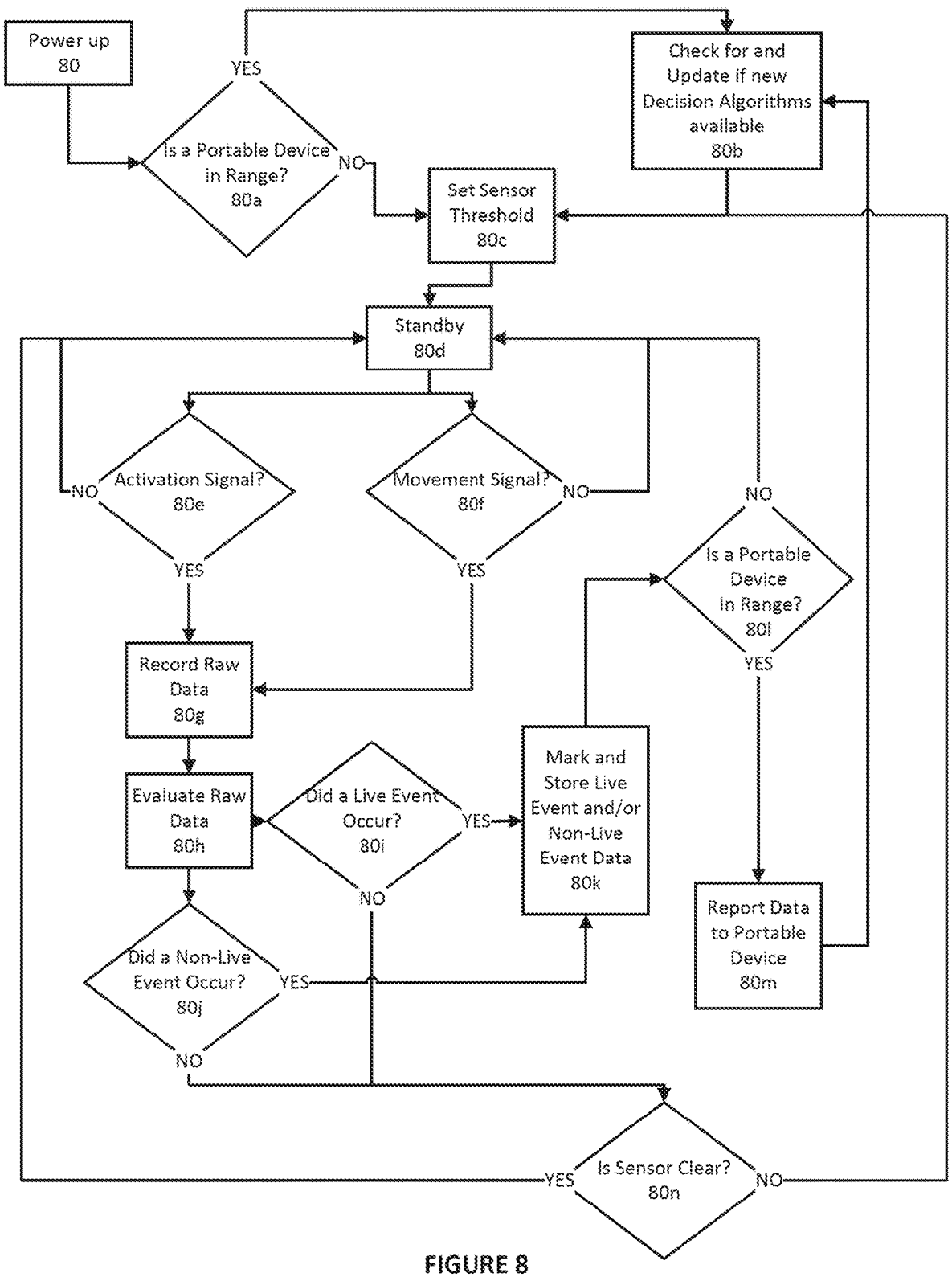
FIG. 8 is a flowchart showing a process of collecting, evaluating and reporting data collected at a PCD in accordance with one embodiment of the invention.

FIG. 8 is a representative flowchart showing a possible control scheme for a PCD having a sensor control system, a processor and wireless communication system. Initially, the PCD is powered up 80, typically at the time the agent is deploying the PCD. The agent ensures the PCD is clean. After powering up, the system will check whether the PCD is in range of a connection to the communication network 80 and if so check for and update the control system software if updates are available 80b. After this step, sensor thresholds are set at an initial startup value by the controller 80c. After deployment the system is in standby 80d awaiting signals at the sensor. If activation 80e and/or movement 80f signals are received, the raw data of those signals is recorded 80g. If no signals are received, the system remains in standby 80d. Depending on the processing capabilities of each PCD, the system may take different steps with regards to raw data. Generally, the system may a) record all data for subsequent download, b) undertake some preliminary filtering of raw data based on current filtering algorithms and store that filtered data for subsequent download or c) undertake a more thorough analysis of the raw data based on more sophisticated pattern recognition algorithms and store that filtered data for subsequent download. Various combinations of this general functionality may be implemented.

For example, in one embodiment and as shown in FIG. 8, the system evaluates the raw data 80h and determines whether or not the combination of movement and activation signal data constitutes either a live event 80i or a non-live event 80j. If an event (live or non-live) is determined to have occurred 80h, the system will store the relevant data and may mark the data as being a live event or non-live event based on the filtering software/firmware in the controller. This pre-filtered data may then be stored for subsequent upload to a PD or communication system. The system will check periodically if a PD or other communication system is in range 801 and if so, report data to the PD or communication system 80m. Similarly, at that time, the system will check for and update if new decision algorithms are available 80b.

If no live-event has occurred, that is, it is determined that the data received was not the result of a live animal, in some embodiments, the data is discarded and the system returns to standby 80d. Periodically, the system will also evaluate whether the sensor is clear/clean 80n. If the sensor is clear, the system will remain in standby 80d. If the sensor is not clear, the system may adjust the sensor threshold 80c.

In some embodiments, initial filtering of data is achieved at the PCD level which reduces the amount of data that may be transmitted to the portable device and ultimately to the wide area network as shown in FIGS. 3 and 3A.

The system may be adjusted over time, such that the amount of live event data and non-live event data being transmitted is adjusted over time. For example, during a "learning phase" immediately following a deployment, a larger amount of data may be transmitted to the central computer system so as to enable development of improved filtering and pattern recognition algorithms that improve the accuracy of the system.

In other words, the filtering algorithms may be adjusted over time by updating the controller within each device, for example with firmware or software.

Figure 9:
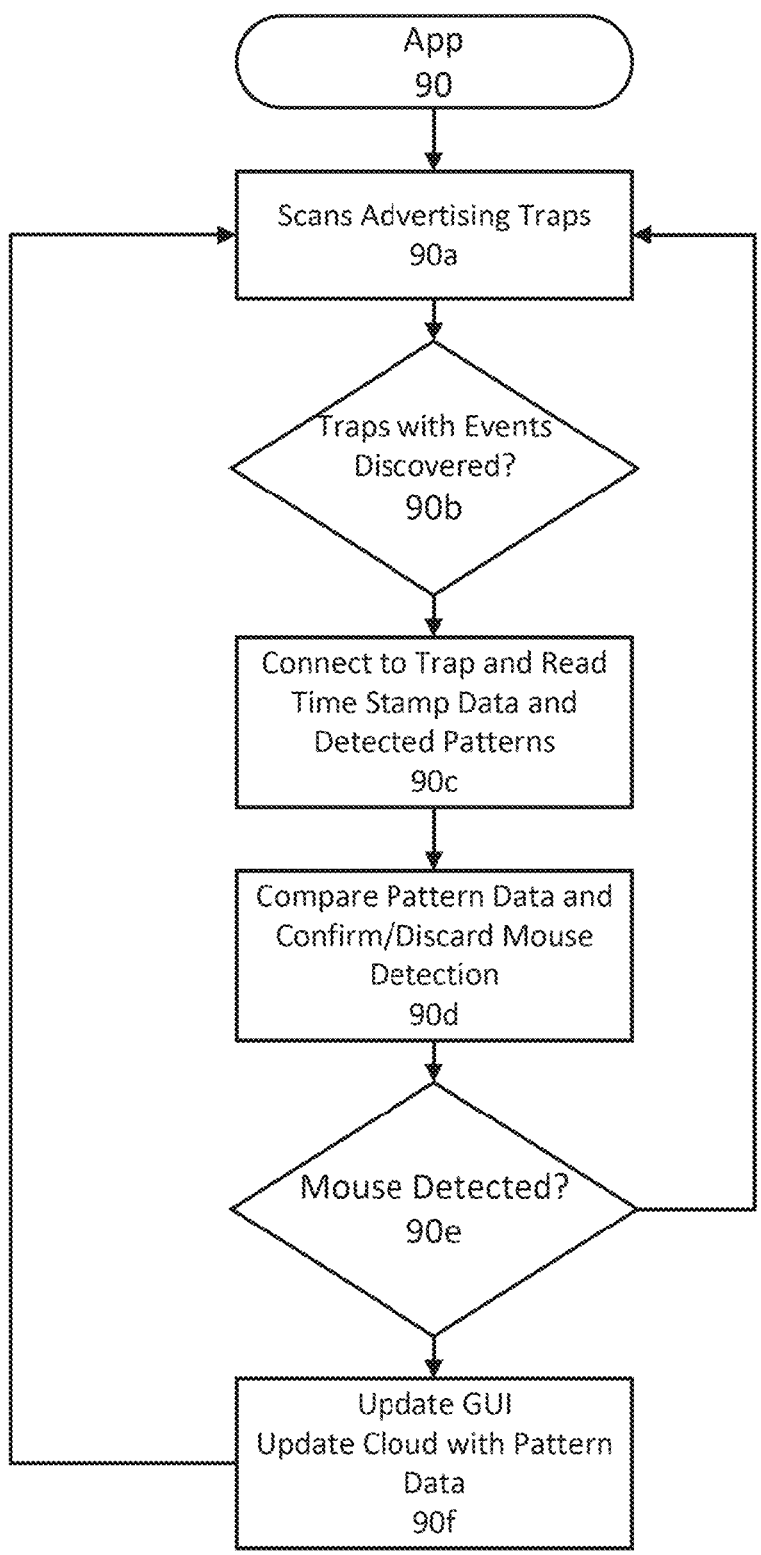
FIG. 9 is a flowchart showing a process of collecting, evaluating and reporting data collected at a portable device in accordance with one embodiment of the invention.

As shown in FIG. 3B and FIG. 9, at the portable device level, the portable device generally acts to provide information to the agent regarding the status of the PCD and to make pattern recognition decisions based on the current pattern recognition algorithms and libraries. The PDs also act to relay data from the PCD to the cloud/wide-area-network (WAN) 30d and associated computer(s) 30e. The PD may also relay new software/firmware from the cloud/WAN to the PD and/or PCDs. Generally, in those deployments where there is no continuous or substantially continuous communication with the central computer system, the majority of analysis will be conducted at the PD level to determine whether an event has occurred or not.

In this case, as shown in FIG. 9, application software 90 operating on the portable device will scan for PCDs 90a in its vicinity. If PCDs with events are discovered 90b, the PD will connect to the PCD and receive the event data 90c such as the time stamp data and the detected patterns. Software on the PD will interpret the event data 90d and based on current interpretation algorithms make a decision whether or not one or more live events and/or non-live events occurred. If one or more events have occurred (i.e. an assumption that one or more mice have been detected 90e and/or other data that suggests that the PCD requires attention), the PD graphical user interface (GUI) would be updated 90f to show the PCA the status of the PCD and specifically whether the PCD needs to be serviced or not. Whether a PCD requires service or not will also depend on the type of PCD and the number of live events that can occur before requiring attention (e.g. one for a kill trap but multiple events for a bait station) as well as other factors including the fouling of the sensors or other issues such as power or communication faults.

In addition, the application software can consolidate data from multiple PCDs if desired for uploading to the central computer system.

In one embodiment, the PCA will be prompted to verify that the status indication that they received for each PCD is correct or not. For example, upon receiving a signal that a PCD needs attention, possibly because one or more events were detected, if upon inspecting the PCD, it appears to not have required attention, this can be marked as a false positive event. Thus, at a later time, the associated data from the PCD can be reviewed and the pattern recognition algorithms potentially improved upon as discussed below.

False positive and false negative data may be marked as such using the PD. Moreover, in various embodiments additional details may be entered about the nature of the false event including, for example, noting various observations about the PCD including the amount of contamination, type of contamination (e.g. animal (animal body, feces or urine) and/or natural contaminants (e.g. sand, soil, biomass)), position (e.g. elevated or ground level) and environmental observations (e.g. flooding, and/or physical damage). As a result, observational data may subsequently be correlated to particular data patterns such that the pattern recognition algorithms can be updated to adjust for potential scenarios in the future. For example, contamination by blowing sand may be observed to provide false positive events that incorrectly result in a PCD's status as requiring attention. If particular patterns associated with blowing sand can be analyzed and statistically shown to be a unique pattern, a pattern recognition algorithm may be updated to look for a blowing sand pattern and when observed mark that event as a non-live event, thus reducing the number of false positive readings that may be associated with this type of contamination.

Figure 10:
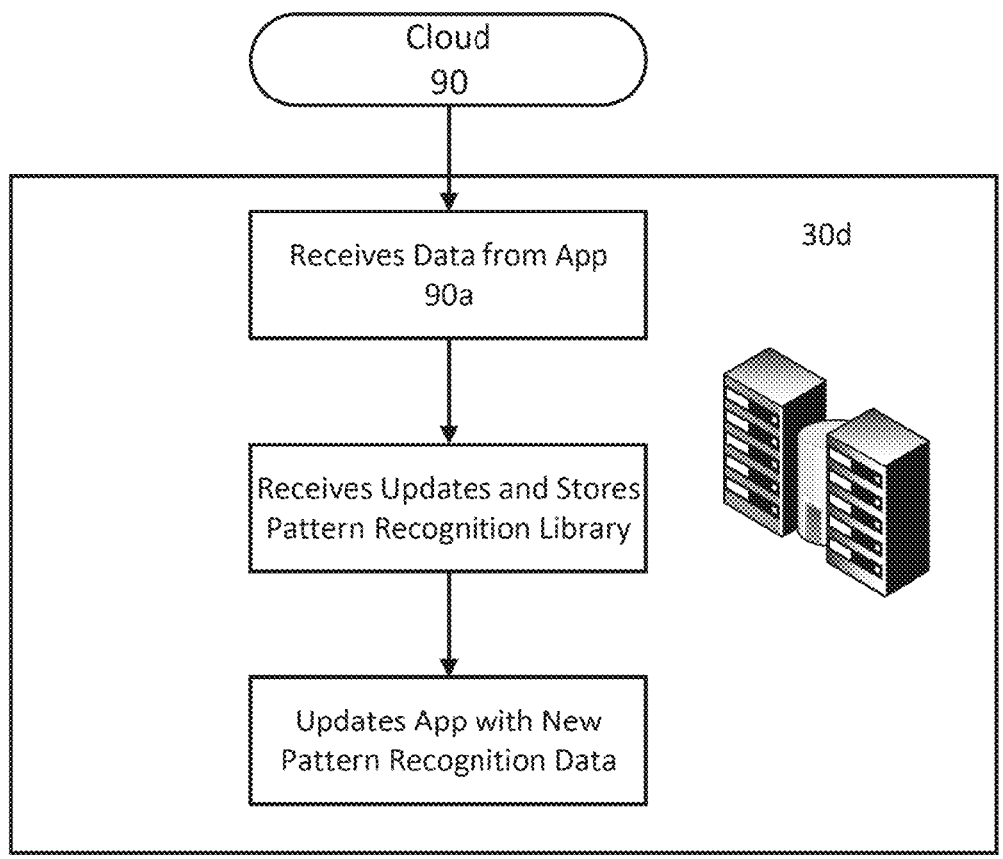
FIG. 10 is a flowchart showing a process of collecting, evaluating and reporting data collected from a wide area network in accordance with one embodiment of the invention.

FIG. 10 is a flowchart showing a process of collecting, evaluating and reporting data collected from a wide area network in accordance with one embodiment of the invention.

At the cloud/WAN level, and at a central computer system 30d, data from a larger number of PCDs and many events is received over particular time periods including hourly, daily, weekly, monthly time periods. This data is analyzed and/or summarized to create reports including reports sent to customers to report on ongoing operations and for billing as well as analysis of sensor data to improve/adjust parameters for determining events and determining the effectiveness of a particular deployment strategy/plan at a particular location.

The raw data files (which may be at least partially filtered as described above) together with input regarding whether or not false positive and false negative events occurred around particular events is used to improve the accuracy of filtering algorithms for determining whether or not an event actually occurred or not. For example, if a PCA notes that in one particular area of a warehouse where there were 10 traps deployed and notes that 7 had false positive signals had been received, the particular event data for that group of traps could be analyzed to note any particular reasons for those false positives. For example, it may be noted that these traps were particularly dirty and false positives may potentially be attributable to a particular type of contamination such as blowing sand, water ingress, etc. If a particular type of pattern is attributable to those PCDs, further refinement of the event algorithms may be developed and deployed back out to individual PCDs and PDs in the future.

Over time as the database of events increases, any changes developed may be back-tested on historical data and previous false positive/false negative events to determine if new filtering/pattern recognition algorithms improves these indicators. New algorithms may be also developed for particular PCD models having a particular physical layout and types of sensors. As such, additional information about the accuracy of particular types/models of PCD can be determined. For example, it may be determined that a particular model of PCD having a particular sensor array has fewer false positive or negative events than other models. Hence, the operators can use this data for planning for the likely effectiveness of a particular type of PCD.

When new algorithms are developed, depending on the deployment, these may be downloaded to all PDs in the system as application software (e.g. updating via Apple App store) or directly via the interconnected network system (e.g. the mesh communication system).

In various embodiments, other sensors and combination of sensors may be utilized such as mechanical, IR, temperature, humidity, mass, sound sensors, etc.

Pest Control Device Design

In various embodiments, existing PCDs are retrofitable with inserts such as new PCD floors/walls/covers containing the sensor, controller and communication electronics. For example, existing PCDs having a defined floor area and shape can be readily retrofit with a new PCD floor that seats within an existing PCD.

Figure 11A:
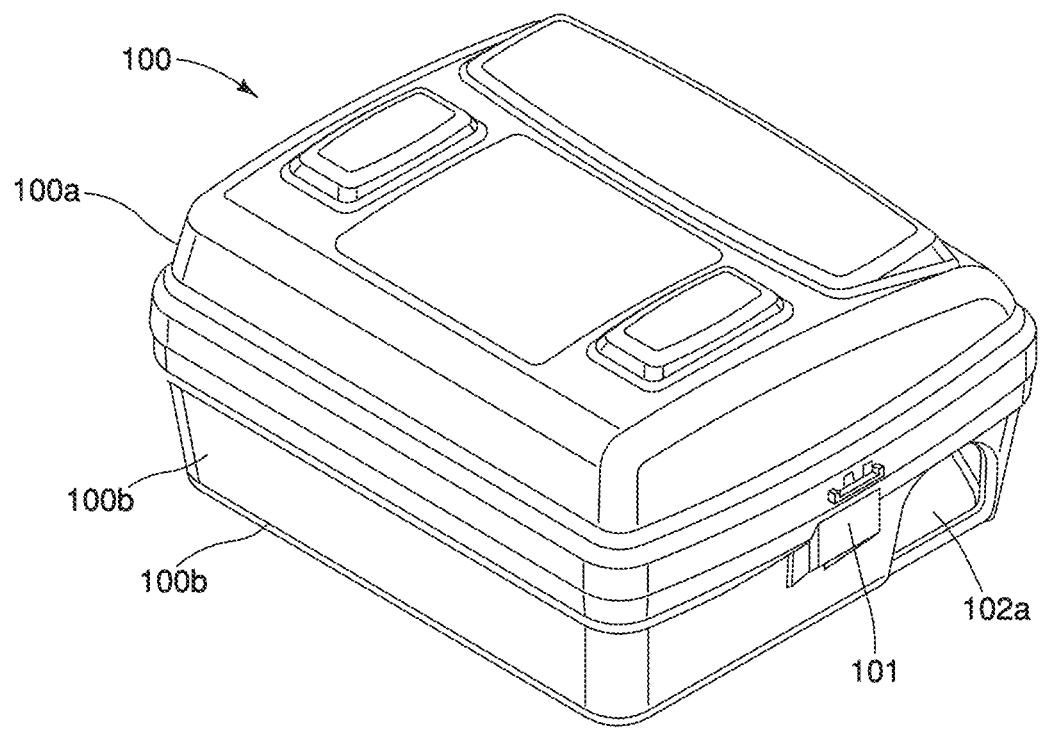
FIGS. 11A and 11B are top and bottom perspective views of a bait station pest control device (PCD) in a closed configuration in accordance with one embodiment of the invention.
Figure 11B:
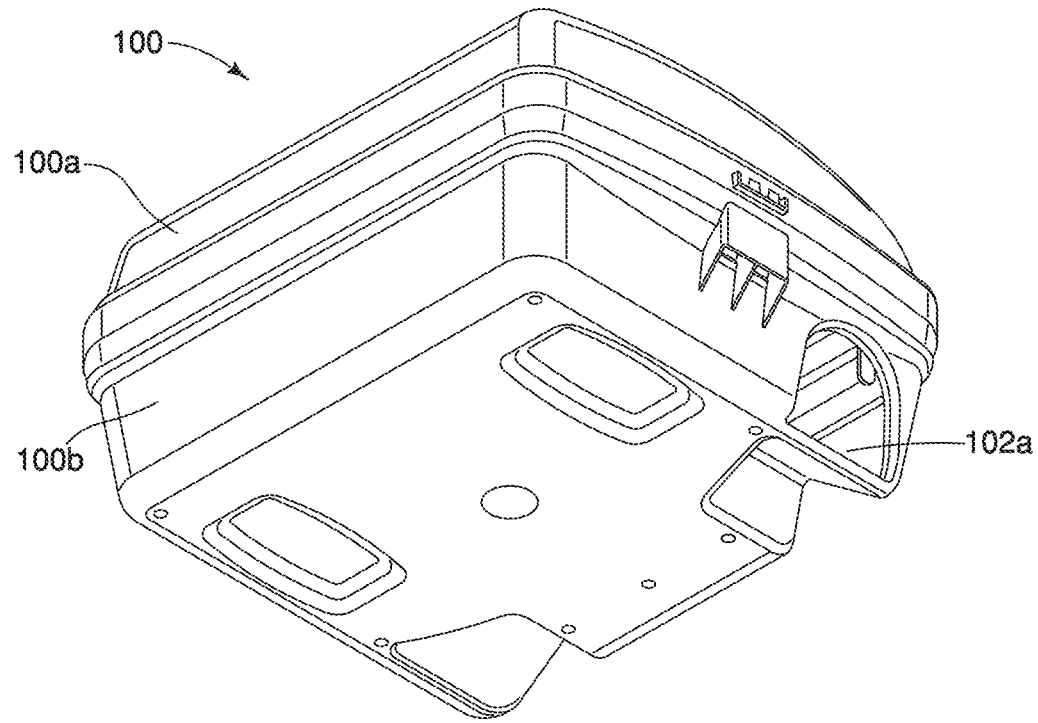
Figure 11C:
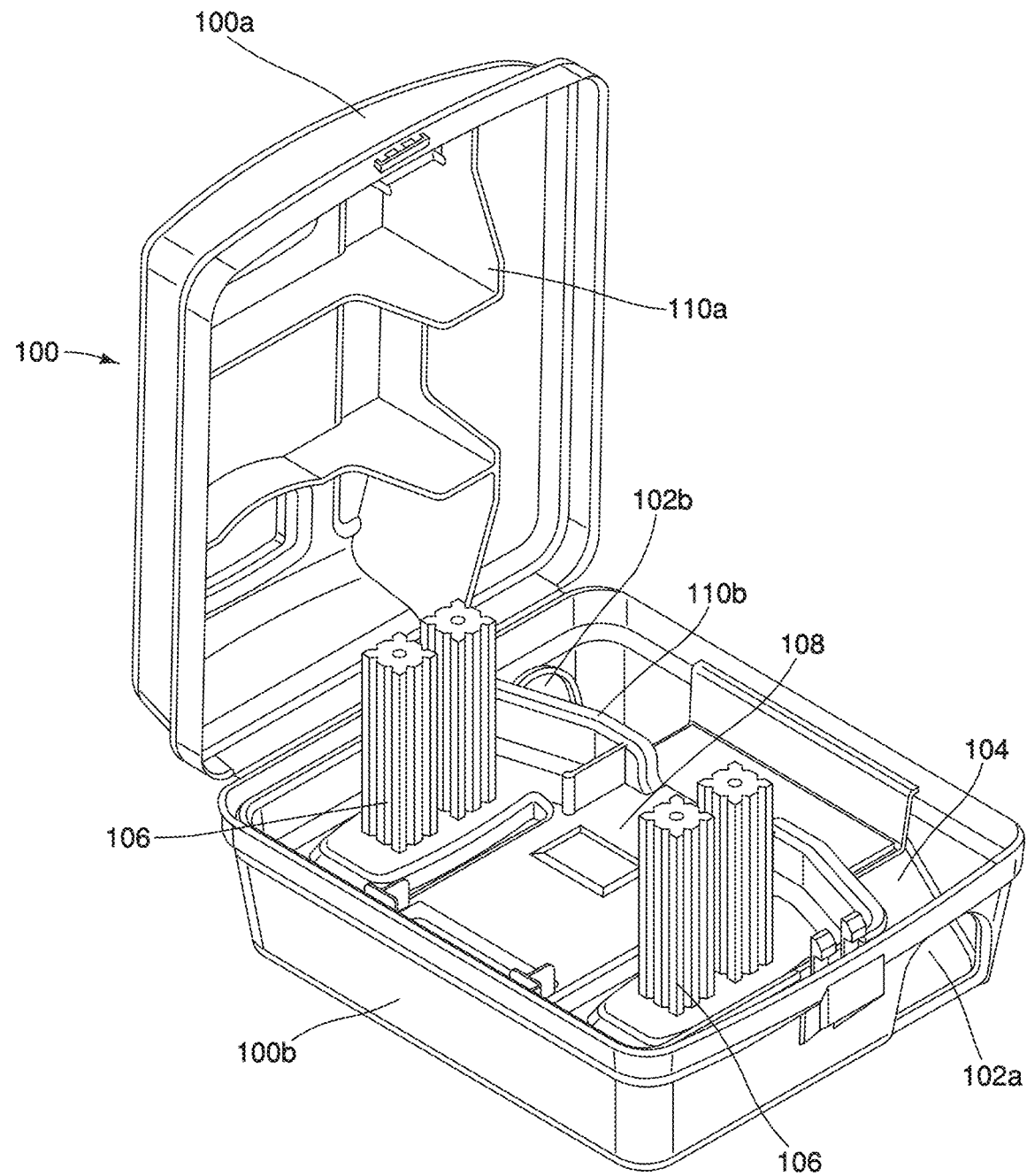
FIG. 11C is a perspective view of a bait station PCD with an open lid in accordance with one embodiment of the invention.

In addition, PCDs incorporating features are described in FIGS. 11A-11H for a bait station type PCD. As shown in FIGS. 11A-11O, a typical PCD may have a typical enclosed box design 100 having an upper lid 100a and lower tray compartment 100b hingedly connected to one another and having one or more locking catches 101 that secure the upper lid and lower tray together. The lower tray compartment may include one or more entrances 102a,b. The PCD is typically manufactured from an injection molded thermoplastic.

As shown in FIG. 11O, with the PCD in an open position, the interior of the PCD includes various dividers and surfaces that create defined spaces within the PCD. For example, in this example, the lower tray includes the two entrances 102a,b, ramp surfaces 104, bait areas 106 and sensor area 108. Dividers 110a on the lid and on the tray 110b form the defined spaces when the lid is closed.

As such, when the PCD is closed and deployed, a pest will enter the PCD over the ramp and pass over the sensor area before reaching the bait areas. The sensor area is configured such the movement of the pest over and past the sensor area creates signal patterns that can be interpreted as a pest as described above.

Figure 11D:
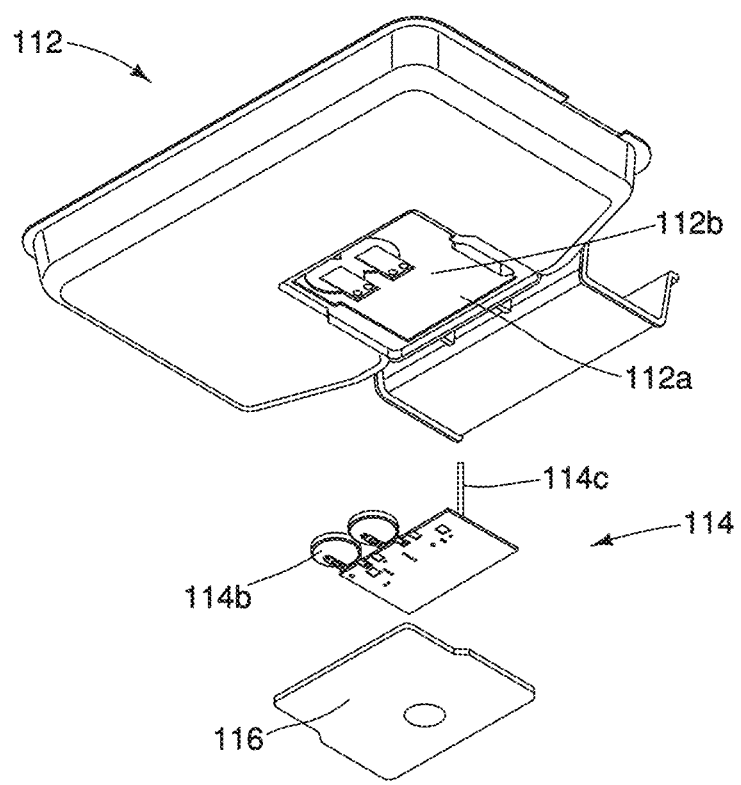
FIGS. 11D and 11E are bottom and top perspective and exploded views of the underside of a bait station PCD tray showing the positioning of a printed circuit board (PCB) with an integral antenna and PCB cover in accordance with one embodiment of the invention.
Figure 11E:
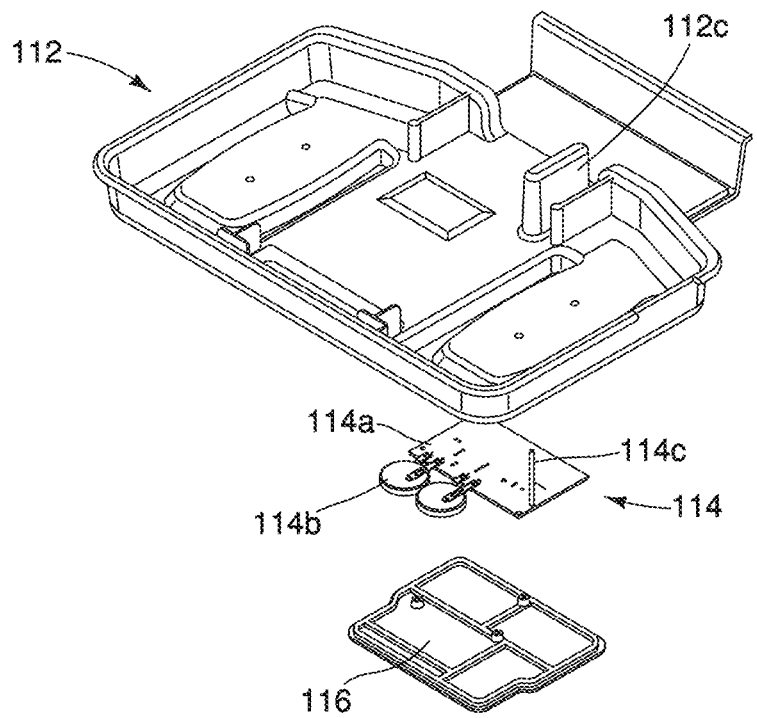

As shown in FIGS. 11D and 11E, the lower tray 100b may also be configured with a removable tray 112 designed to seat within the lower tray as a removable component. As shown and in this case, as a retrofit tray 112, the tray 112 fits within an existing PCD enclosure without interfering with the dividers as described above, thus substantially and primarily providing a new floor system for the PCD.

The retrofit tray 112 is configured to include a sensor system 114 that can be operatively placed and sealed against an underside of the retrofit tray so as to provide sensor capabilities to the tray in a waterproof or sealed system. The sensor system will generally include a printed circuit board (PCB) 114a, batteries 114b and an antenna 114c. The sensor system will engage against the tray within a recess 112a having the general shape of the PCB and batteries. The antenna 114c may project above the main floor of the tray through a hole 112b.

Generally, it is preferable that the antenna is in a generally vertical orientation to optimize its communication and range within the communication system. The antenna may project into a sealed antenna cavity 112c as shown in FIG. 11E and be formed as part of the tray. Generally, the sealed antenna cavity is dimensioned such that the antenna does not physically contact the inner walls of the sealed antenna cavity, again to optimize its communication and range within the communication system.

Figure 11F:
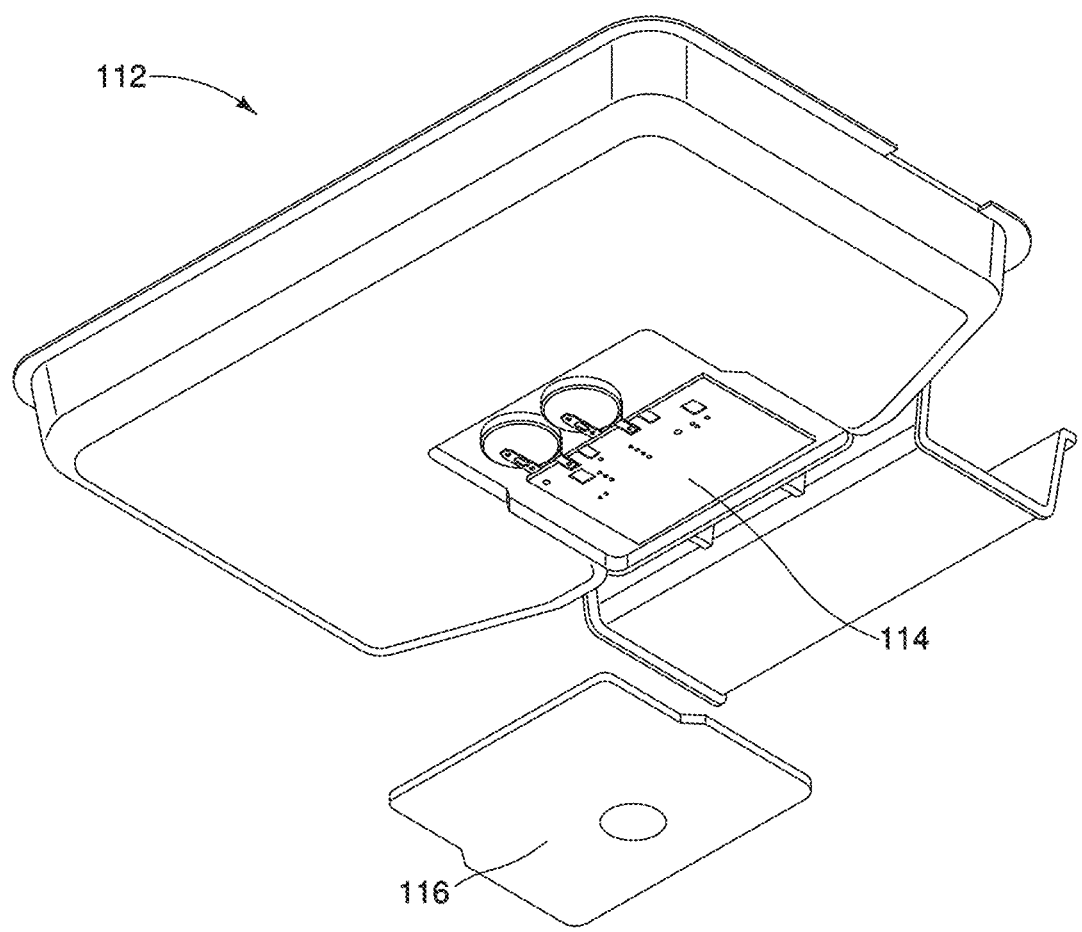
FIG. 11F is a perspective and exploded view of the underside of a bait station PCD tray showing the positioning of a printed circuit board (PCB) against the underside of the PCD tray in accordance with one embodiment of the invention.
Figure 11G:
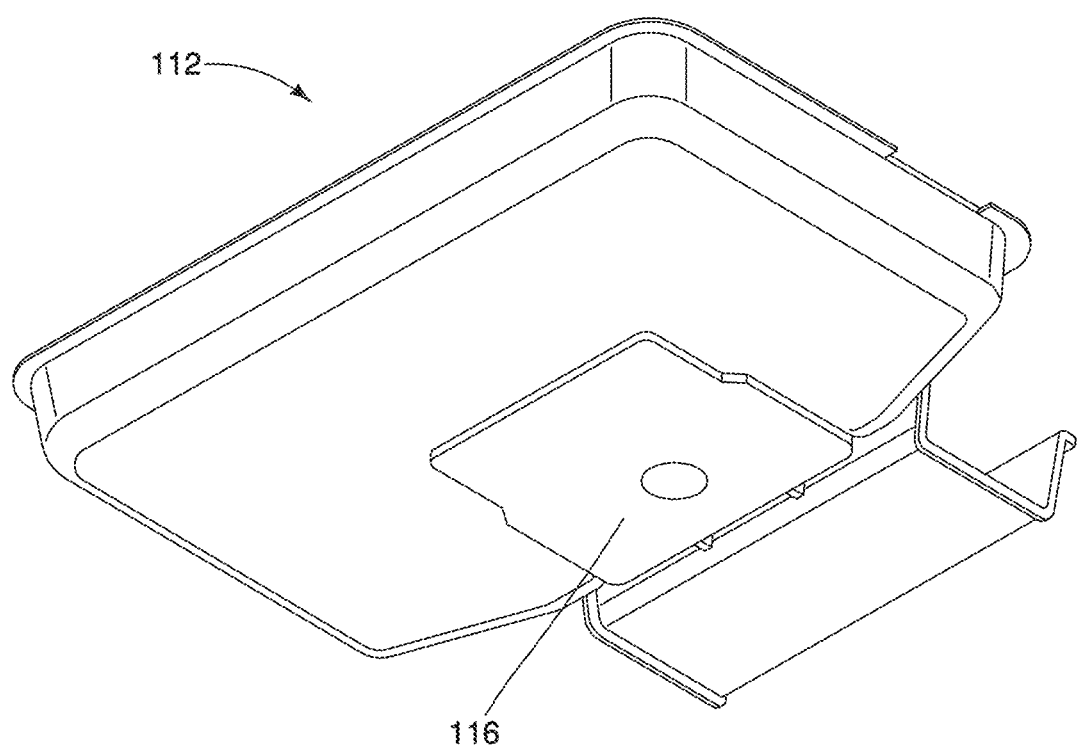
FIG. 11G a perspective view of the underside of a bait station PCD tray as in FIG. 11F with a PCB cover in place in accordance with one embodiment of the invention.

It is also preferable that the sensor system is fully sealed against the tray so as to ensure sensor system longevity inter alia by preventing water/moisture/contaminant ingress. As shown in FIG. 11F, the sensor system 114 is fixed within the recess 112a and as shown in FIG. 11G, cover 116 can be sealed against the sensor system and tray to form a sealed compartment containing the sensor system.

In various embodiments, the retrofit tray may be disposable or re-usable. A disposable tray will typically be designed to have a life-span of 2-4 years where the sensor system is permanently sealed within the tray. At the end of its life-span, typically when the batteries have depleted, the entire tray may be discarded. In other embodiments, the tray may be a re-usable tray that will enable replacement of the sensor system upon depletion of the batteries in which case the cover 116 may be removable allowing a new sensor package and/or batteries to be installed.

Generally, it is anticipated that disposable systems will be preferred due to the risks of leakage around a removable cover. That is, as a removable cover will require additional sealing elements, such as gaskets or o-rings, a permanently sealed sensor chamber may be preferable due to lower manufacturing costs and lower risks/costs that may be associated with replacing batteries and/or servicing units.

Figure 11H:
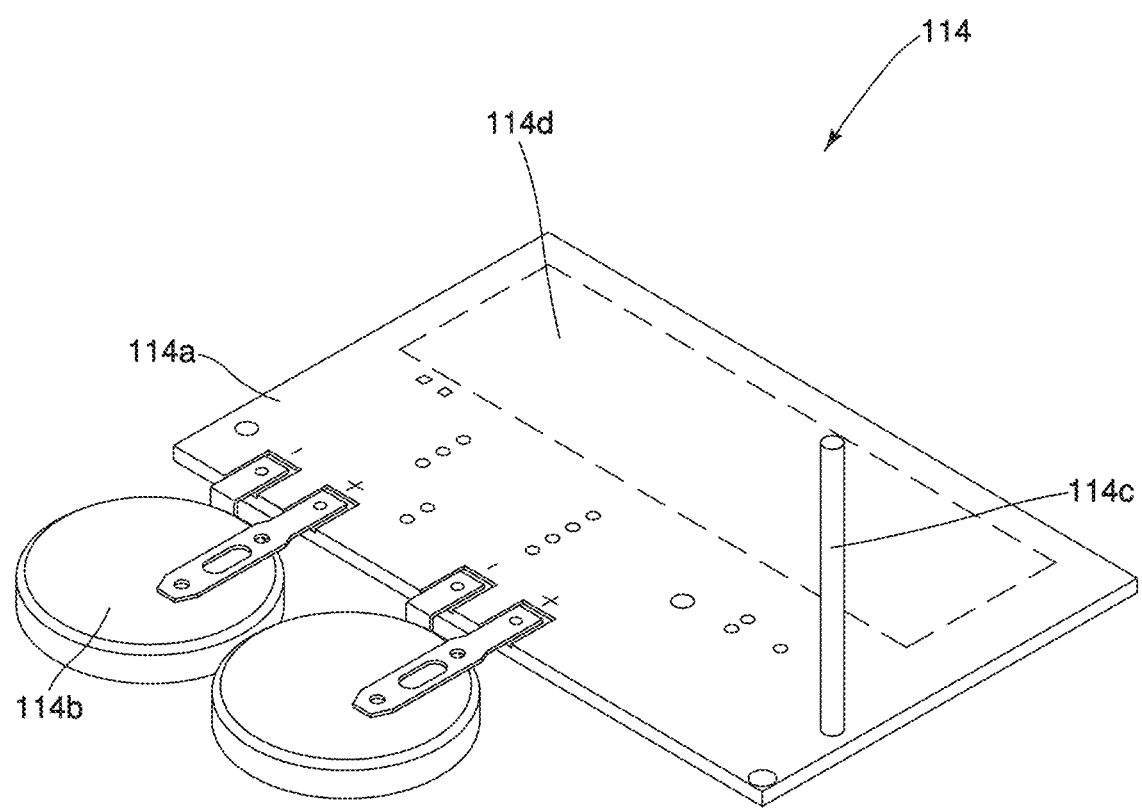
FIG. 11H a perspective top view of a bait station PCB board with antenna projecting upwardly in accordance with one embodiment of the invention.

As shown in FIG. 11H, the sensor system will generally include a PCB 114a, one or more batteries 114b and an antenna 114c. The PCB 114 may include separate areas including a sensor area 114d where those sensors detecting movement are located and an electronics/communication area containing the appropriate sensor driver, power management, data collection and processing, memory and communication electronics.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A pest control device (PCD) comprising:
a PCD body, having a floor and a wall system defining at least one passageway from outside the PCD body to inside the PCD body, the floor including an entrance area and a bait area, the bait area being positioned within the PCD body such that a pest successively passes through the entrance area to reach the bait area;
a first capacitive sensor configured to the PCD body between the entrance area and the bait area;
a PCD controller connected to the first capacitive sensor, where the first capacitive sensor and PCD controller are configured to detect within a time frame a) a mass near or over the first capacitive sensor as an activation event and b) multiple movements near or over the first capacitive sensor as movement events, and wherein the PCD controller is configured to analyze activation and movement events to distinguish between animate and inanimate objects.

2. The PCD as in claim 1 wherein the first capacitive sensor is a single-electrode capacitive sensor.

3. The PCD as in claim 1 wherein a movement event is detected or filtered at a lower threshold relative to an activation event.

4. The PCD as in claim 2 wherein the PCD controller is configured to dynamically adjust a sensitivity threshold of the single-electrode capacitive sensor over time.

5. The PCD as in claim 1 further comprising a wireless communication system having an antenna and where the first capacitive sensor is configured beneath the floor and where the communication system and antenna are sealed within a sensor compartment.

6. The PCD as in claim 1 wherein the PCD controller is configured to receive raw data from the first capacitive sensor including device event data representing presence or movement of animate bodies adjacent the first capacitive sensor.

7. The PCD as in claim 6 where the PCD controller is configured to analyze any one of or a combination of frequency of signals from the first capacitive sensor, a rate of change of frequency, time of and time between signal bundles and statistics relating to each of frequency of signals from the first capacitive sensor, a rate of change of frequency, time of and time between signal bundles as a basis to interpret if an activation or movement event is occurring.

8. The PCD as in claim 1 further comprising a second capacitive sensor configured to the entrance area and where the PCD controller is configured to analyze signals received from the second capacitive sensor and wherein the PCD controller is configured to analyze activation and movement events to distinguish between animate and inanimate objects.

9. The PCD as in claim 1 wherein the PCD controller is configured to filter data and discard data corresponding to inanimate objects.

10. The PCD as in claim 9 further comprising a wireless communication system configured to the PCD controller and where the PCD controller is configured to transmit filtered data.

11. The PCD as in claim 1 further comprising a bait sensor configured to the bait area to provide data about interaction with bait.

* * * * *